(12) United States Patent
Hiramatsu et al.

(10) Patent No.: US 11,869,449 B2
(45) Date of Patent: Jan. 9, 2024

(54) IMAGE PROCESSING DEVICE, IMAGE PROCESSING METHOD, DISPLAY DEVICE HAVING ARTIFICIAL INTELLIGENCE FUNCTION, AND METHOD OF GENERATING TRAINED NEURAL NETWORK MODEL

(71) Applicant: SATURN LICENSING LLC, New York, NY (US)

(72) Inventors: Takeshi Hiramatsu, Tokyo (JP); Hiroyuki Tahara, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 59 days.

(21) Appl. No.: 17/596,206

(22) PCT Filed: Jun. 11, 2020

(86) PCT No.: PCT/JP2020/023016
§ 371 (c)(1),
(2) Date: Dec. 6, 2021

(87) PCT Pub. No.: WO2020/250973
PCT Pub. Date: Dec. 17, 2020

(65) Prior Publication Data
US 2022/0319443 A1 Oct. 6, 2022

(30) Foreign Application Priority Data
Jun. 13, 2019 (JP) .................... 2019-110354

(51) Int. Cl.
*G09G 3/00* (2006.01)
*G09G 3/34* (2006.01)
*G06N 3/08* (2023.01)

(52) U.S. Cl.
CPC .............. *G09G 3/342* (2013.01); *G06N 3/08* (2013.01); *G09G 3/3413* (2013.01); *G09G 2320/064* (2013.01); *G09G 2354/00* (2013.01)

(58) Field of Classification Search
CPC ................. G09G 3/342; G09G 3/3413; G09G 2320/064; G09G 2354/00; G06N 3/08
See application file for complete search history.

(56) References Cited

U.S. PATENT DOCUMENTS

| 6,084,981 A | 7/2000 | Horiba et al. |
| 2011/0148318 A1* | 6/2011 | Shackle ................. H05B 45/10 |
| | | 315/291 |

(Continued)

FOREIGN PATENT DOCUMENTS

| CN | 102667903 A | 9/2012 |
| CN | 107835324 | 3/2018 |

(Continued)

OTHER PUBLICATIONS

International Search Report and Written Opinion of PCT Application No. PCT/JP2020/023016, dated Aug. 4, 2020, 12 pages of ISRWO.

*Primary Examiner* — Michael A Faragalla
(74) *Attorney, Agent, or Firm* — Richard LaPeruta

(57) ABSTRACT

An image processing device that realizes local dimming control and push-up control of a display device using an artificial intelligence function is provided. The image processing device includes a trained neural network model that estimates a local dimming pattern representing light emitting states of light source units corresponding to a plurality of areas divided from a display area of an image display unit for a target display image, and a control unit that controls the light emitting states of the light source units on the basis of the local dimming pattern estimated by the trained neural (Continued)

network model for the target display image displayed on the image display unit.

17 Claims, 15 Drawing Sheets

(56) References Cited

U.S. PATENT DOCUMENTS

| | | | | |
|---|---|---|---|---|
| 2011/0175935 | A1* | 7/2011 | S | H05B 45/20 345/213 |
| 2012/0069170 | A1* | 3/2012 | Gesley | G06T 7/0012 348/79 |
| 2012/0306944 | A1* | 12/2012 | Sangam | H05B 45/20 345/691 |
| 2016/0372057 | A1 | 12/2016 | Katsu et al. | |
| 2017/0039471 | A1 | 2/2017 | Ogawa | |
| 2018/0005588 | A1 | 1/2018 | Kurokawa | |
| 2020/0184905 | A1 | 6/2020 | Park | |
| 2020/0260150 | A1* | 8/2020 | Wong | H04N 21/4788 |

FOREIGN PATENT DOCUMENTS

| | | |
|---|---|---|
| CN | 109643514 | 4/2019 |
| JP | H05181993 | 7/1993 |
| JP | 8-292752 A | 11/1996 |
| JP | 2000321571 | 11/2000 |
| JP | 2007-143010 A | 6/2007 |
| JP | 4915143 B2 | 4/2012 |
| JP | 2015-092529 A | 5/2015 |
| JP | 2017-037392 A | 2/2017 |
| JP | 2018-025759 A | 2/2018 |
| JP | 2018194719 | 12/2018 |
| JP | 2019-211581 A | 12/2019 |
| WO | 2011/087718 A1 | 7/2011 |
| WO | 2018/002774 A1 | 1/2018 |
| WO | 2018/215867 A1 | 11/2018 |

\* cited by examiner

IMAGE PROCESSING DEVICE, IMAGE PROCESSING METHOD, DISPLAY DEVICE HAVING ARTIFICIAL INTELLIGENCE FUNCTION, AND METHOD OF GENERATING TRAINED NEURAL NETWORK MODEL

CROSS REFERENCE TO RELATED APPLICATIONS

This application is a U.S. National Phase of International Patent Application No. PCT/JP2020/023016 filed on Jun. 11, 2020, which claims priority benefit of Japanese Patent Application No. JP 2019-110354 filed in the Japan Patent Office on Jun. 13, 2019. Each of the above-referenced applications is hereby incorporated herein by reference in its entirety.

TECHNICAL FIELD

The technology disclosed in the present description (hereinafter referred to as the present disclosure) relates to an image processing device and an image processing method using an artificial intelligence function, a display device having the artificial intelligence function, and a method of generating a trained neural network model.

BACKGROUND ART

Many display devices such as television receivers and computer monitor devices have uniform luminance dynamic ranges throughout their screen. Technologies for reducing power consumption and improving picture quality by controlling the luminance of a screen are known. In the case of a liquid crystal display device, for example, a single backlight disposed on the backside of a liquid crystal panel irradiates the entire screen with light at uniform and constant brightness. Accordingly, reduction of power consumption and improvement of picture quality are realized by controlling the brightness of the backlight.

Recently, a local dimming technology of dividing a screen into a plurality of regions and controlling the brightness of each region has been developed, which can enhance the effects of reduction of power consumption and improvement of picture quality. In the case of a backlight liquid crystal display, luminance contrast can be improved by lightening a backlight corresponding to a region having a high signal level and dimming a backlight corresponding to a region having a low signal level. Further, it is possible to realize a high dynamic range by increasing the luminance when partial white display is performed (while maintaining constant output power of the entire backlight) using a push-up technology of distributing power reduced in a dark part to a region having a high signal level to cause the region to intensively emit light (refer to PTL 1).

CITATION LIST

Patent Literature

[PTL 1]
JP 4915143 B
[PTL 2]
JP 2015-92529 A
[PTL 3]
JP 2007-143010 A

SUMMARY

Technical Problem

An object of the present disclosure is to provide an image processing device and an image processing method which realize local dimming control and push-up control of a display device using an artificial intelligence function, a display device having the artificial intelligence function, and a method of generating a trained neural network model.

Solution to Problem

A first aspect of the present disclosure is an image processing device including a trained neural network model that estimates a local dimming pattern representing light emitting states of light source units corresponding to a plurality of regions divided from a display area of an image display unit for a target display image, and a control unit that controls the light emitting states of the light source units on the basis of the local dimming pattern estimated by the trained neural network model.

The trained neural network model is trained to estimate a local dimming pattern in further consideration of push-up processing of distributing power curbed in a first unit corresponding to a dark part of the display area to a second unit corresponding to a bright part.

Furthermore, the trained neural network model is trained to estimate a local dimming pattern for the target display image to be displayed on the image display unit and second information. The second information is an audio signal synchronized with the target display image, information for decoding a video signal of the target display image or information for decoding an audio signal synchronized with the video signal, information about content, information about device characteristics of the image display unit, information about a watching environment of the image display unit, information about a user who watches the image display unit, and information about an operation performed on the image display unit.

In addition, a second aspect of the present disclosure is an image processing method including
 a step of estimating, using a trained neural network model that estimates a local dimming pattern representing light emitting states of light source units corresponding to a plurality of areas divided from a display area of an image display unit for a target display image, a local dimming pattern for the target display image to be displayed on the image display unit, and
 a step of controlling the light emitting states of the light source units on the basis of the estimated local dimming pattern.

In addition, a third aspect of the present disclosure is a display device having an artificial intelligence function, including
 an image display unit capable of controlling light emitting states of light source units corresponding to a plurality of area units divided from a display area,
 a trained neural network model that estimates a local dimming pattern representing the light emitting states of the light source units for a target display image to be displayed by the image display unit, and
 a control unit that controls the light emitting states of the light source units on the basis of the local dimming pattern estimated by the trained neural network model.

In addition, a fourth aspect of the present disclosure is a method of generating a trained neural network model that estimates a local dimming pattern representing light emitting states of light source units corresponding to a plurality of areas divided from a display area of an image display unit for a target display image, the method including an input step of inputting the target display image to a neural network model, an evaluation step of evaluating a local dimming pattern estimated by the neural network model from the target display image, and a training step of training the neural network model on the basis of a result of the evaluation.

Advantageous Effects of Invention

According to the present disclosure, it is possible to provide an image processing device and an image processing method which adaptively control local dimming and push-up of a display device in real time using an artificial intelligence function, a display device having the artificial intelligence function, and a method of generating a trained neural network model.

The effects described in the present description are merely illustrative and effects of the present disclosure are not limited thereto. In addition, the present disclosure may further obtain additional effects in addition to the aforementioned effects.

Other objects, features, and advantages of the present disclosure will become clear according to detailed description based on embodiments which will be described later and the attached drawings.

DESCRIPTION OF EMBODIMENTS

Hereinafter, the technology according to the present disclosure will be described in the following order with reference to the drawings.

Figure 1:
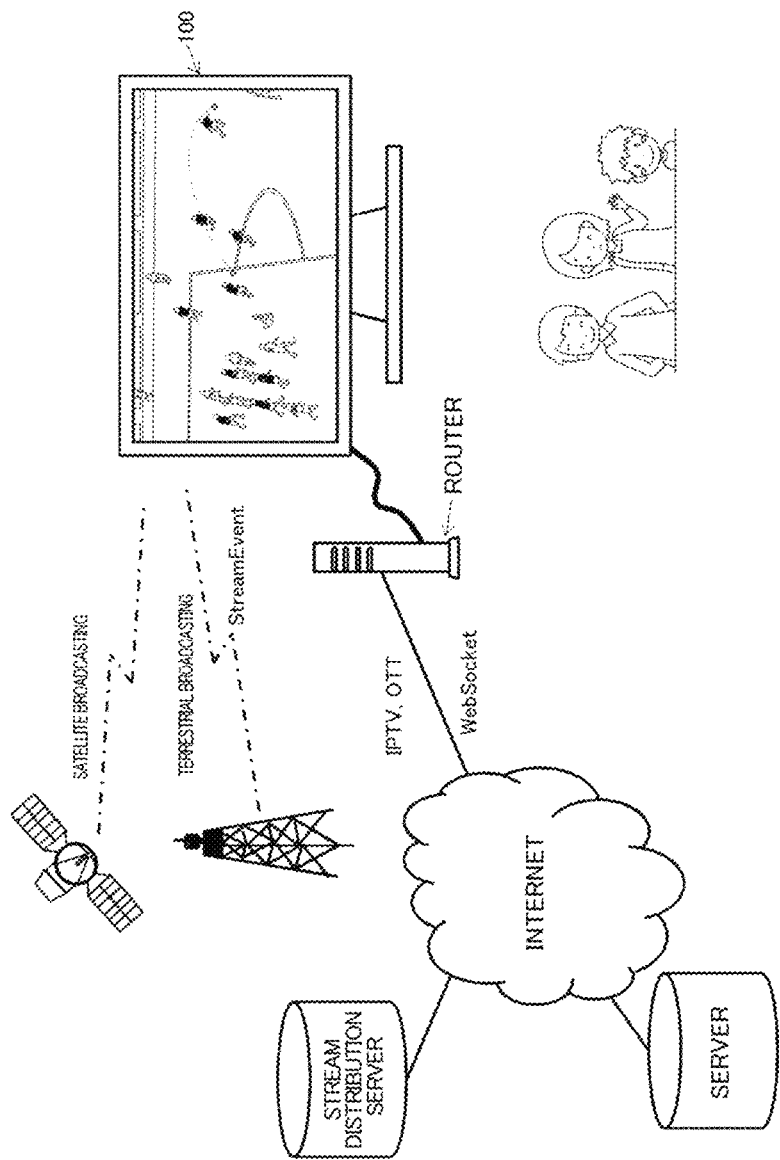
FIG. 1 is a diagram illustrating a configuration example of a system for watching video content.

A. System configuration
B. Sensing function
C. Display that realizes local dimming and push-up technologies
D. Local dimming and push-up control using artificial intelligence function
E. Learning of neural network A. System Configuration FIG. 1 schematically illustrates a configuration example of a system for watching video content.

A television reception device 100 is provided with a large screen for displaying video content and a speaker for outputting sound. The television reception device 100 may include, for example, a tuner for selecting and receiving a broadcast signal or may be connected to a set-top box and use broadcasting services provided by broadcasting stations. A broadcast signal may be any of a terrestrial broadcast signal and a satellite broadcast signal.

In addition, the television reception device 100 can also use a broadcast-type moving image distribution service and a moving image sharing service, for example, using a network such as an Internet protocol TV (IPTV) or over-the-top (OTT). Accordingly, the television reception device 100 is provided with a network interface card and connected to an external network such as the Internet via a router or an access point using communication based on existing communication standards such as Ethernet (registered trademark) and Wi-Fi (registered trademark).

A stream distribution server that distributes video streams is installed on the Internet and provides a broadcast-type moving image distribution service to the television reception device 100.

In addition, numerous servers that provide various services are installed on the Internet. An example of a server is a stream distribution server. The television reception device 100 can start a browser function, issue, for example, a Hyper Text Transfer Protocol (HTTP) request for the stream distribution server, and use a web service.

Furthermore, it is assumed that an artificial intelligence server (not illustrated) that provides functions of artificial intelligence is also present on the Internet (or cloud) for clients in the present embodiment. Meanwhile, a "server" mentioned in the present description is not limited to a single server device and may have a form of a cloud that provides a cloud computing service, for example.

Figure 2:
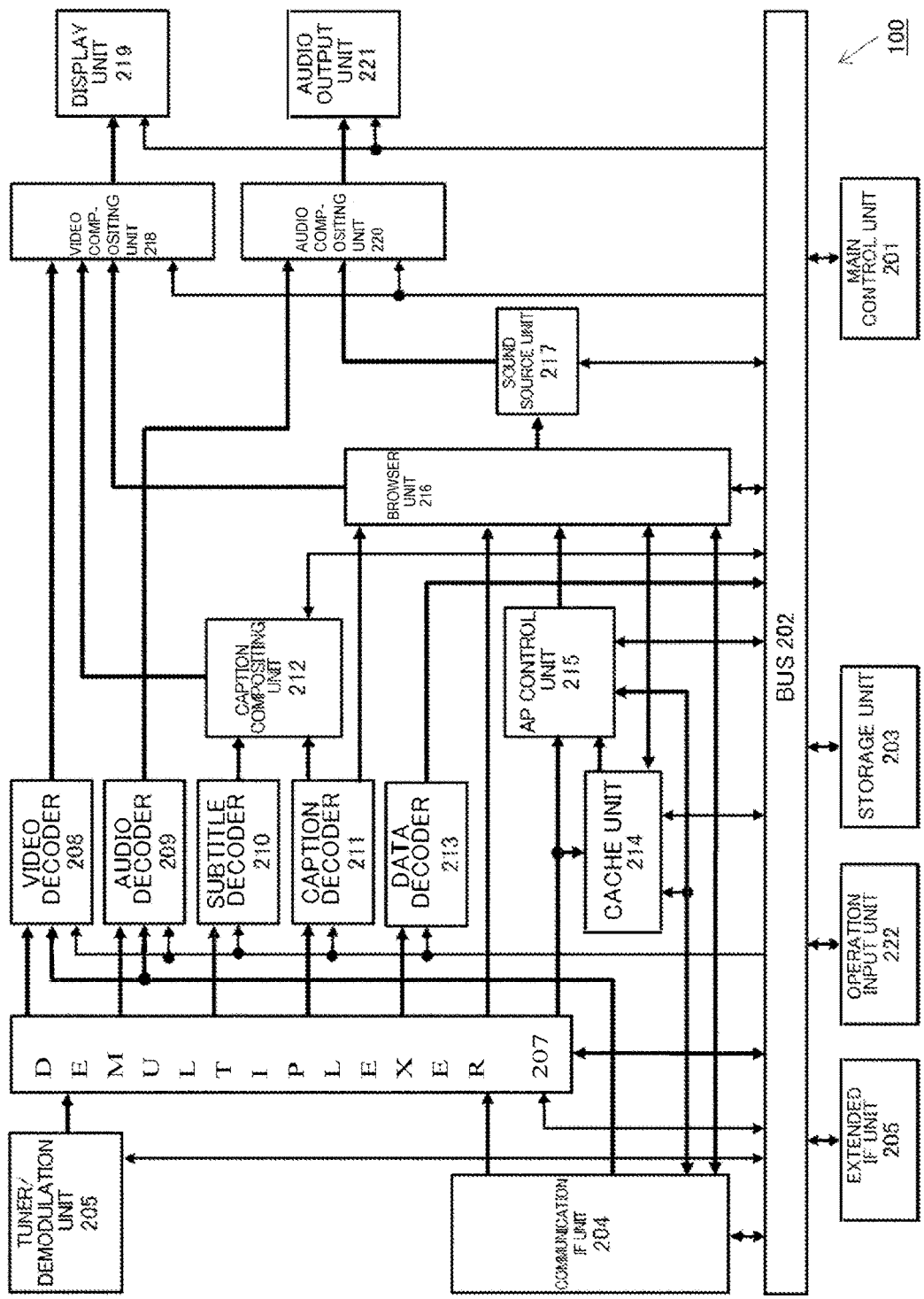
FIG. 2 is a diagram illustrating a configuration example of a television reception device 100.

FIG. 2 is a diagram illustrating a configuration example of the television reception device 100. The television reception device 100 includes a main control unit 201, a bus 202, a storage unit 203, a communication interface (IF) unit 204, an extended interface (IF) unit 205, a tuner/demodulation unit 206, a demultiplexer (DEMUX) 207, a video decoder 208, an audio decoder 209, a subtitle decoder 210, a caption decoder 211, a caption compositing unit 212, a data decoder 213, a cache unit 214, an application (AP) control unit 215, a browser unit 216, a sound source unit 217, a video compositing unit 218, a display unit 219, an audio compositing unit 220, an audio output unit 221, and an operation input unit 222.

The main control unit 201 may include, for example, a controller, a read only memory (ROM) (assumed to include a rewritable ROM such as an electrically erasable programmable ROM (EEPROM)), and a random access memory (RAM) and integrally controls overall operation of the television reception device 100 according to a predetermined operation program. The controller is configured as a central processing unit (CPU), a micro-processing unit (MPU), a graphics processing unit (GPU), a general purpose graphics processing unit (GPGPU), or the like. The ROM is a nonvolatile memory in which a basic operation program such as an operating system (OS) and other operation programs are stored. Operation setting values necessary for the operation of the television reception device 100 may be stored in the ROM. The RAM serves as a work area when the OS and other operation programs are executed. The bus 202 is a data communication path for performing data transmission and reception between the main control unit 201 and each part of the television reception device 100.

The storage unit 203 is configured as a nonvolatile storage device such as a flash ROM, a solid state drive (SSD), or a hard disk drive (HDD). The storage unit 203 stores operation programs and operation setting values of the television reception device 100, personal information of a user who uses the television reception device 100, and the like. In addition, the storage unit 203 stores operation programs downloaded through the Internet and various types of data created using the operation programs, and the like. Further, the storage unit 203 can also store content such as moving images, still images and audio acquired through broadcast waves and the Internet.

The communication interface unit 204 is connected to the Internet via the router (described above) and transmits/receives data to/from each server device and other communication apparatuses on the Internet. In addition, the communication interface unit 204 is assumed to acquire data streams of programs transmitted through a communication link. Connection between the communication interface unit 204 and the router may be any of wired connection such as Ethernet (registered trademark) and wireless connection such as Wi-Fi (registered trademark).

The tuner/demodulation unit 206 receives broadcast waves such as terrestrial broadcasting or satellite broadcasting via an antenna (not illustrated) and tunes in to (selects) a channel of a desired service (broadcasting station or the like) of a user on the basis of control of the main control unit 201. In addition, the tuner/demodulation unit 206 demodulates a received broadcast signal to acquire a broadcast data stream. Meanwhile, the television reception device 100 may include a plurality of tuners/demodulation units (i.e., multiple tuners) for the purpose of simultaneously displaying a plurality of screens or recording programs on different channels.

The demultiplexer 207 respectively distributes a video stream, an audio stream, a subtitle stream, and a caption data stream which are real-time presentation elements to the video decoder 208, the audio decoder 209, a subtitle decoder 210, and a caption decoder 211 on the basis of a control signal in an input broadcast data stream. Data input to the demultiplexer 207 includes data according to broadcasting services and distribution services such as IPTV and OTT. The former is selected, received and demodulated by the tuner/demodulation unit 206 and then input to the demultiplexer 207 and the latter is received by the communication interface unit 204 and then input to the demultiplexer 207. In addition, the demultiplexer 207 reproduces a multimedia application and file data that is a constituent element thereof and outputs the reproduction result to the application control unit 215 or temporarily accumulates the reproduction result in the cache unit 214.

The video decoder 208 decodes the video stream input from the demultiplexer 207 and outputs video information. In addition, the audio decoder 209 decodes the audio stream input from the demultiplexer 207 and outputs audio information. In digital broadcasting, a video stream and an audio stream each coded according to MPEG2 system standard, for example, are multiplexed and transmitted or distributed. The video decoder 208 and the audio decoder 209 perform decoding processing on the coded video stream and the coded audio image stream demultiplexed by the demultiplexer 207 according to standardized decoding methods. Meanwhile, to simultaneously perform decoding processing on a plurality of types of video streams and audio streams, the television reception device 100 may include a plurality of video decoders 208 and audio decoders 209.

The subtitle decoder 210 decodes the subtitle data stream input from the demultiplexer 207 and outputs subtitle information. The caption decoder 211 decodes the caption data stream input from the demultiplexer 207 and outputs caption information. The caption compositing unit 212 performs compositing processing on the subtitle information output from the subtitle decoder 210 and the caption information output from the caption decoder 211.

The data decoder 213 decodes a data stream multiplexed into an MPEG-2 TS stream along with video and audio. For example, the data decoder 213 may notify the main control unit 201 of a result obtained by decoding a general-purpose event message stored in a descriptor region of a program map table (PMT) that is a program-specific information (PSI) table.

The application control unit 215 receives control information included in a broadcast data stream from the demultiplexer 207 or acquires control information from a server device on the Internet via the communication interface unit 204 and interprets the control information.

The browser unit 216 presents a multimedia application file and file data that is a constituent element thereof acquired from a server device on the Internet via the cache unit 214 or the communication interface unit 204 according to instruction of the application control unit 215. The multimedia application file mentioned here may be, for example, a Hyper Text Markup Language (HTML) document, a Broadcast Markup Language (BML) document, or the like. In addition, the browser unit 216 is assumed to reproduce audio information of an application by acting on the sound source unit 217.

The video compositing unit 218 performs processing of receiving the video information output from the video decoder 208, the caption information output from the caption compositing unit 212, and the application information output from the browser unit 216 and appropriately selecting or overlapping the received information. The video compositing unit 218 includes a video RAM (illustration thereof is omitted), and a display operation of the display unit 219 is performed on the basis of video information input to the video RAM. In addition, the video compositing unit 218 also performs processing of overlapping an electronic program guide (EPG) screen and screen information such as graphics generated by an application executed by the main control unit 201 on the basis of control of the main control unit 201 as necessary.

The display unit 219 presents a screen on which video information on which selecting or overlapping processing has been performed by the video compositing unit 218 is displayed to a user. The display unit 219 may be a display device including, for example, a liquid crystal display, an organic electroluminescent (EL) display, a self-emission type display using microscopic light-emitting diode (LED) elements for pixels (refer to PTL 2, for example), or the like.

It is assumed that the display unit 219 uses a display device to which a local dimming technology of dividing a screen into a plurality of regions and controlling brightness for each region is applied in the present embodiment. A signal level of a target display image displayed by the display unit 219 is not uniform and the target display image includes a bright part having a high signal level and high luminance and a dark part having a low signal level and low luminance. The local dimming technology individually switches driving in response to luminance necessary for each region based on signal level deviation in an image of one frame. A display using a backlight liquid crystal panel has the advantage of improving luminance contrast by lightening a backlight corresponding to a bright part having a high signal level and dimming a backlight corresponding to a dark part having a low signal level. In a local dimming display device, it is possible to realize a high dynamic range by increasing the luminance when partial white display is performed (while maintaining constant output power of the entire backlight) using a push-up technology of distributing surplus power obtained by reducing output of a backlight of a dark part to a backlight of a bright part to cause the backlight of the bright part to intensively emit light (refer to PTL 1, for example).

The audio compositing unit 220 receives audio information output from the audio decoder 209 and audio information of an application reproduced by the sound source unit 217 and performs appropriate processing such as selecting or compositing. In addition, the audio compositing unit 220 also performs sound quality improvement such as high resolution and audio signal processing such as noise removal.

The audio output unit 221 is used for audio output of program content and data broadcasting content selected and received by the tuner/demodulation unit 206 and output of audio information (composite audio of audio guidance or an audio agent, and the like) processed by the audio compositing unit 220. The audio output unit 221 is configured as a sound generation element such as a speaker. For example, the audio output unit 221 may be a speaker array composed of a combination of a plurality of speakers (a multi-channel speaker or a super-multi-channel speaker), or some or all speakers thereof may be externally attached and connected to the television reception device 100.

Figure 3:
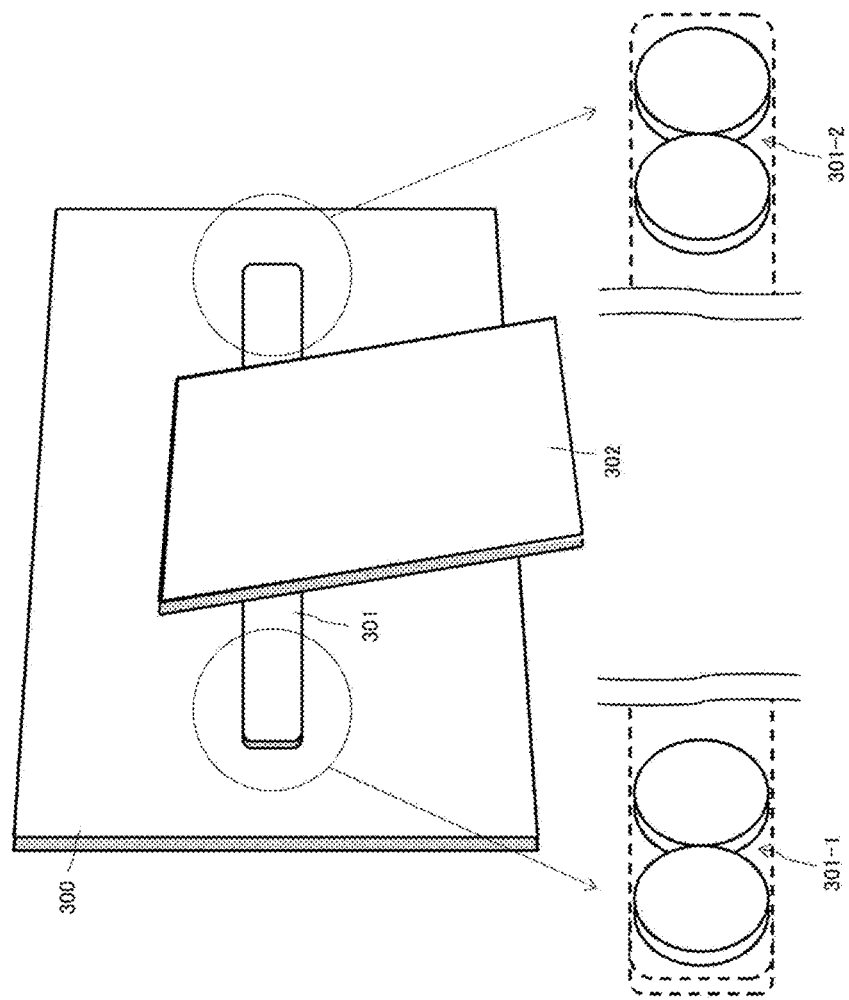
FIG. 3 is a diagram illustrating an example of application of a panel speaker technology.

A flat panel type speaker (refer to PTL 3, for example) in addition to a cone type speaker can be used as the audio output unit 221. Of course, a speaker array composed of a combination of different types of speakers can also be used as the audio output unit 221. In addition, a speaker array may include one that performs audio output by vibrating the display unit 219 according to one or more exciters (actuators) that generate vibration. An exciter (actuator) may be retrofitted in the display unit 219 in some cases. FIG. 3 illustrates an example of application of a panel speaker technology to a display. A display 300 is supported by a stand 302 on the backside thereof. A speaker unit 301 is attached to the backside of the display 300. An exciter 301-1 is disposed at the left edge of the speaker unit 301 and an exciter 301-2 is disposed at the right edge thereof to constitute a speaker array. The exciters 301-1 and 301-2 can vibrate the display 300 on the basis of left and right audio signals to output sound. The stand 302 may include a subwoofer that outputs low-register sound. Meanwhile, the display 300 corresponds to the display unit 219 using an organic EL element.

Referring back to FIG. 2, the configuration of the television reception device 100 will be described. The operation input unit 222 is configured as an instruction input device or the like by which a user inputs an operation instruction for the television reception device 100. The operation input unit 222 may be configured as, for example, an operation key in which a remote controller receiver which receives commands transmitted from a remote controller (not illustrated) and button switches are arranged. In addition, the operation input unit 222 may include a touch panel superimposed on the screen of the display unit 219. Further, the operation input unit 222 may include an external input device, such as a keyboard, connected to the extended interface unit 205.

The extended interface unit 205 is an interface group for extending the functions of the television reception device 100 and may be composed of, for example, an analog video/audio interface, a Universal Serial Bus (USB) interface, a memory interface, and the like. The extended interface unit 205 may include a digital interface including a DVI terminal, an HDMI (registered trademark) terminal, a Display Port (registered trademark) terminal, and the like.

In the present embodiment, the extended interface 205 is also used as an interface for receiving sensor signals of various sensors included in a sensor group (refer to the following description and FIG. 3). The sensors are assumed to include both sensors provided inside the main body of the television reception device 100 and sensors externally connected to the television reception device 100. The externally connected sensors also include sensors included in other consumer electronic (CE) apparatuses present in the same space as the television reception device 100 and Internet of Things (IoT) devices. The extended interface 205 may receive a sensor signal after signal processing such as noise removal and digital conversion are performed thereon or receive the sensor signal as unprocessed RAW data (analog waveform signal).

B. Sensing Function

One of purposes of providing various sensors in the television reception device 100 is to realize automation of user operations of the television reception device 100. Examples of user operations of the television reception device 100 include power on and power off, channel switching (or automatic channel selection), input switching (switching to a stream distributed according to an OTT service, input switching to a recording apparatus or a Blu-ray reproduction apparatus, and the like), volume adjustment, screen brightness adjustment, picture quality adjustment, and the like.

Meanwhile, it is assumed that someone referred to simply as "user" is a viewer who watches (also including a case of being scheduled to watch) video content displayed on the display unit 219 unless particularly mentioned otherwise in the present description.

Figure 4:
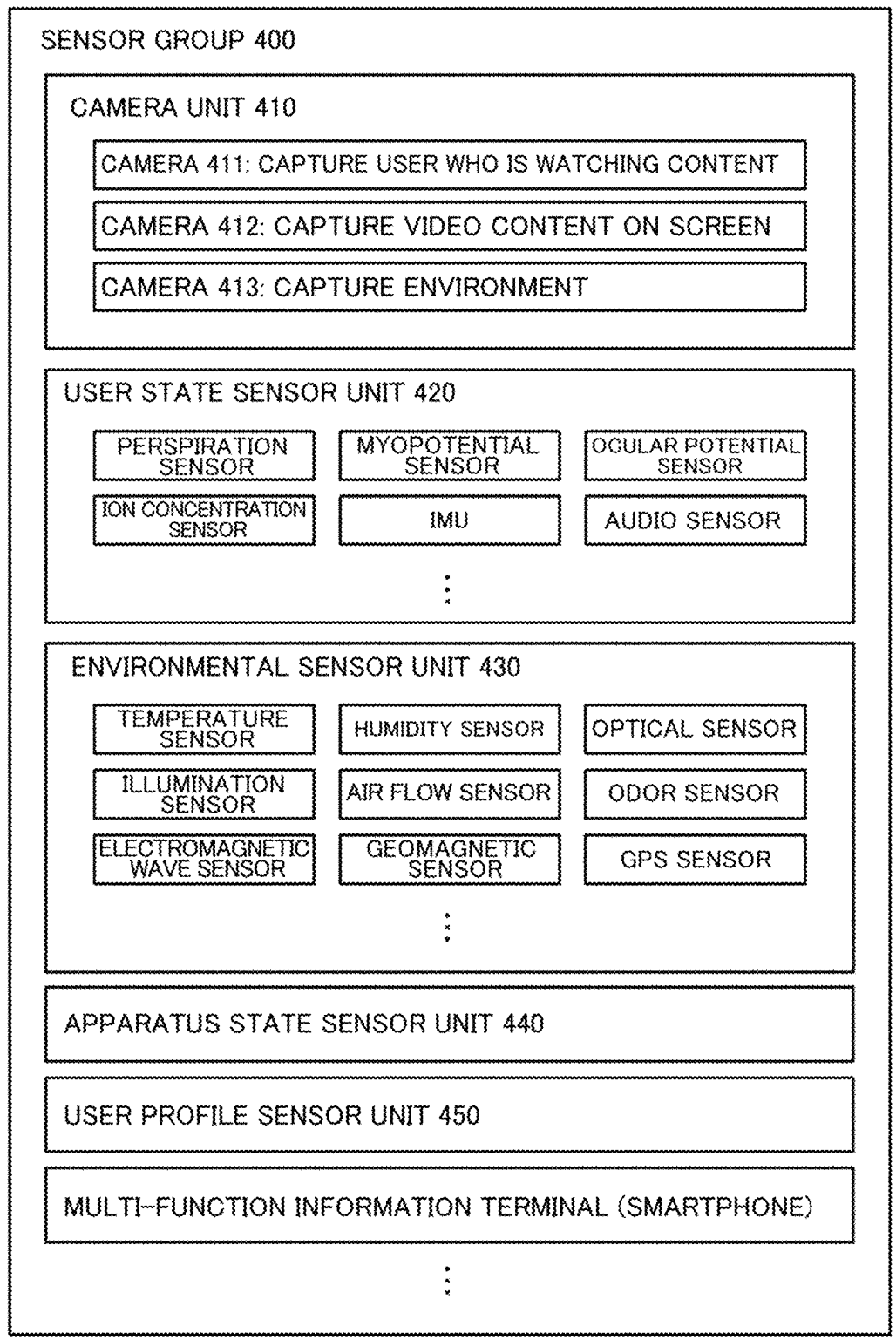
FIG. 4 is a diagram illustrating a configuration example of a sensor group 400 provided in the television reception device 100.

FIG. 4 illustrates a configuration example of a sensor group 400 provided in the television reception device 100. The sensor group 400 includes a camera unit 410, a user state sensor unit 420, an environmental sensor unit 430, an apparatus state sensor unit 440, and a user profile sensor unit 450.

The camera unit 410 includes a camera 411 that captures an image of a user who is watching video content displayed on the display unit 219, a camera 412 that captures an image of video content displayed on the display unit 219, and a camera 413 that captures an image of an indoor space (or an installation environment) in which the television reception device 100 is installed.

The camera 411 may be installed, for example, near the center of the upper edge of the screen of the display unit 219 and suitably capture an image of a user who is watching video content. The camera 412 may be installed, for example, facing the backside of the display unit 219 and capture an image of video content that is being watched by a user. Alternatively, the user may put on a goggle equipped with the camera 412. In addition, the camera 412 is assumed to include a function of recording audio of video content. Furthermore, the camera 413 may be configured, for example, as a panoramic camera or a wide angle camera and capture an image of an indoor space (or an installation environment) in which the television reception device 100 is installed. Alternatively, the camera 413 may be, for example, a camera mounted on a camera table (platform) that is rotatable about respective axes of roll, pitch, and yaw. However, when sufficient environmental data can be acquired by the environmental sensor 430 or environmental data itself is not necessary, the camera 410 is not necessary.

The state sensor unit 420 includes one or more sensors for acquiring state information about a user state. The state sensor unit 420 may intend to acquire, as state information, for example, a working state of a user (whether the user watches video content), a behavior state of the user (movement state such as staying still, walking, and running, an open/closed state of eyelids, a direction of a line of sight, and the size of pupils), a mental state (a degree of impression such as whether the user is immersed in or concentrating on video content, a degree of excitation, a degree of alertness, emotion, affection, and the like), and a physiological state. The state sensor unit 420 may include various sensors such as a perspiration sensor, a myopotential sensor, an ocular potential sensor, a brainwave sensor, an exhalation sensor, a gas sensor, an ion concentration sensor, and an inertial measurement unit (IMU) that measures a behavior of the user, and an audio sensor (microphone or the like) that collects an utterance of the user.

The environmental sensor unit 430 includes various sensors that measure information about environments such as the indoor space in which the television reception device 100 is installed. For example, a temperature sensor, a humidity sensor, an optical sensor, an illumination sensor, an air flow sensor, an odor sensor, an electromagnetic wave sensor, a geomagnetic sensor, a Global Positioning System (GPS) sensor, an audio sensor (microphone or the like) that collects ambient sound, a distance sensor that measures a distance to a nearby object, and the like are included in the environmental sensor unit 430.

The apparatus state sensor unit 440 includes one or more sensors for acquiring states of the inside of the television reception device 100. Alternatively, circuit components such as the video decoder 208 and the audio decoder 209 may have a function of externally outputting an input signal state, an input signal processing situation (including coding parameters), and the like and serve as sensors for detecting states of the inside of an apparatus. In addition, the apparatus state sensor unit 440 may have a function of reading information about various hardware characteristics of the television reception device 100, stored in the ROM and the like in the main control unit 201, and serve as a sensor for detecting apparatus hardware characteristics. Further, the apparatus state sensor unit 440 may detect an operation such as user interface (UI) settings performed by a user on the television reception device 100 and other apparatuses or preserve a past operation history of the user.

The user profile sensor unit 450 detects profile information about a user who watches video content through the television reception device 100. The user profile sensor unit 450 may not necessarily be configured as a sensor element. For example, the user profile sensor unit 450 may detect a user profile such as the age and the sex of a user on the basis of a face image of the user captured by the camera 411, an utterance of the user collected by the audio sensor, and the like. In addition, the user profile sensor unit 450 may obtain a user profile acquired through a multi-function information terminal carried by a user, such as a smartphone, according to cooperation between the television reception device 100 and the smartphone. However, the user profile sensor unit 450 need not detect confidential information about privacy and secretes of a user. In addition, it is not necessary to detect a profile of the same user whenever the user watches video content, and user profile information acquired once may be preserved, for example, in the EEPROM (described above) in the main control unit 201.

Furthermore, a multi-function information terminal carried by a user, such as a smartphone, may be used as the state sensor unit 420, the environmental sensor unit 430, or the user profile sensor unit 450 according to cooperation between the television reception device 100 and the smartphone. For example, sensor information acquired through sensors included in the smartphone, data managed by applications such as a heath care function (a pedometer and the like), a calendar, a schedule book, a memorandum, mail, and a history of upload and reading of a social networking service (SNS) may be added to state data of a user and environmental data. In addition, sensors included in other CE apparatuses and IoT devices present in the same space as the television reception device 100 may be used as the state sensor unit 420 or the environmental sensor unit 430.

C. Display that Realizes Local Dimming and Push-Up Technologies

It is assumed that the display unit 219 uses a display device to which a local dimming technology of dividing a screen into a plurality of regions and controlling brightness for each region is applied in the present embodiment. When the local dimming technology is applied to a display using a backlit liquid crystal panel, luminance contrast can be improved by lighting a backlight corresponding to a region having a high signal level and dimming a backlight corresponding to a region having a low signal level. Further, it is possible to realize a high dynamic range by increasing the luminance when partial white display is performed (while maintaining constant output power of the entire backlight) by combining the push-up technology of distributing power reduced in a dark part to a region having a high signal level to cause the region to intensively emit light (refer to PTL 1, for example).

Figure 5:
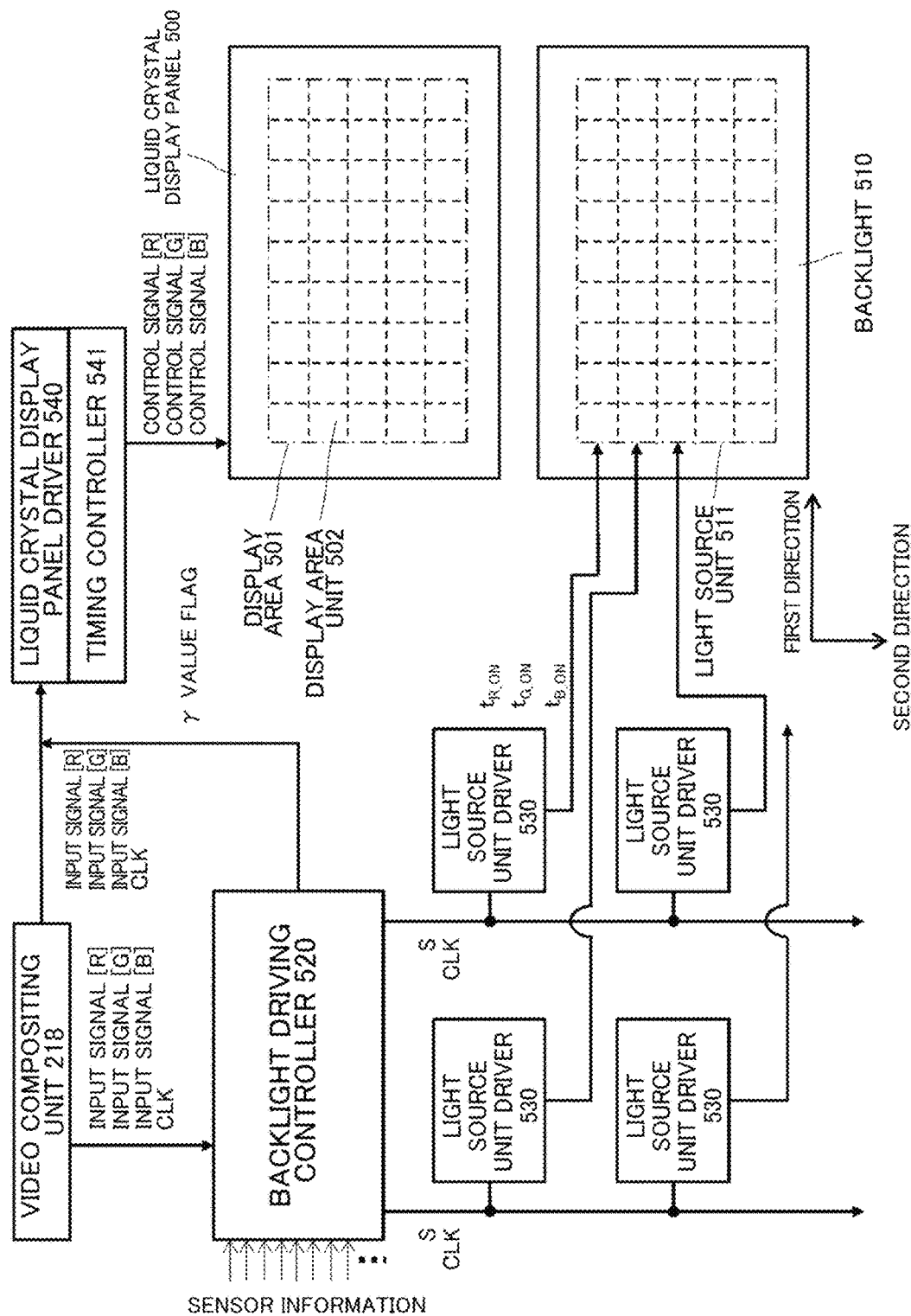
FIG. 5 is a diagram illustrating an internal configuration example of a display device of a liquid crystal display type.

FIG. 5 illustrates an internal configuration example of a display device of a liquid crystal display type applied as the display unit 219.

A liquid crystal display panel 500 includes a display area 501 in which $M_0$ pixels in a first direction and $N_0$ pixels in a second direction, for a total of $M_0 \times N_0$ pixels, are arranged in a matrix form. Specifically, the number $M_0 \times N_0$ of pixels arranged in a matrix form satisfying HD-TV standard as a resolution for image display represented by $(M_0, N_0)$ would be, for example, (1920, 1080). In addition, when local dimming is performed, the display area 501 (indicated by an alternating long and short dash line in FIG. 5) composed of the pixels arranged in a matrix form is divided into P×Q virtual display area units 502 (boundaries thereof are indicated by dotted lines) in the liquid crystal display panel 500. Values of (P, Q) are (19, 12), for example. However, the number of display area units 502 illustrated in FIG. 5 differs from 19×12 for convenience of drawing. In addition, each display area unit 502 is composed of a plurality of (M×N) pixels, and the number of pixels constituting one display area unit 502 may be, for example, about ten thousand.

Each pixel of the liquid crystal display panel 500 is composed of one set of a plurality of sub-pixels emitting light in different colors. More specifically, each pixel is composed of three sub-pixels of a red-light-emitting sub-pixel [R], a green-light-emitting sub-pixel [G], and a blue-light-emitting sub-pixel [B]. The display unit 219 is sequentially driven for respective scan lines. More specifically, the liquid crystal display panel 500 has scan electrodes (extending in the first direction) and data electrodes (extending in the second direction) which intersect in a matrix form, selects scan electrodes by inputting a scan signal to the scan electrodes, and displays an image on the basis of a data signal (a signal based on a control signal) input to the data electrodes during scanning to constitute one screen.

A backlight 510 is a surface lighting device that is provided behind the liquid crystal display panel 500 and lights the display area 501 from behind and may have a direct type structure in which light sources are disposed directly under the liquid crystal display panel 500 or an edge light type structure in which light sources are disposed around a light guide panel. Meanwhile, although the backlight 510 is disposed directly under the liquid crystal display panel 500 in practice, the liquid crystal display panel 500 and the backlight 510 are separately illustrated in FIG. 5 for convenience.

When local dimming is performed as in the present embodiment, the backlight 510 includes P×Q light source units 511 individually disposed to correspond to the P×Q virtual display area units 502. Each light source unit 511 lights a display area unit 502 corresponding thereto from behind. In addition, light emitting states of light sources included in the light source units 511 are individually controlled. Accordingly, each display area unit 502 is a minimum unit that can be locally dimmed. Meanwhile, although values of (P, Q) are, for example, (19, 12), the number of light source units 511 illustrated in FIG. 5 differs from 19×12 (as above) for convenience of drawing.

Each light source unit 511 includes a unit light-emitting module configured as a combination of a predetermined number of a plurality of types of monochromatic light sources. A light-emitting diode (LED) is an example of a light source of each light source unit 511. Alternatively, examples include a cold cathode-ray type fluorescent lamp, an electroluminescence (EL) device, a cold cathode field electron emission device (field emission display (FED)), a plasma display device, and a normal lamp. When a light source is composed of light-emitting diodes, it may be composed of one set of a red-light-emitting diode emitting red light, for example, having a wavelength of 640 nm, a green-light-emitting diode emitting green light, for example, having a wavelength of 530 nm, and a blue-light-emitting diode emitting blue light, for example, having a wavelength of 450 nm to obtain white light. Alternatively, white light can also be obtained according to light emission of a white-light-emitting diode (e.g., a light-emitting diode emitting white light by combining an ultraviolet or blue-light-emitting diode and fluorescent particles). Light-emitting diodes emitting light in a fourth color, a fifth color, . . . , other than red, green, and blue may be further included. When a light-emitting diode is used for a light source of each light source unit 511, each light source unit 511 is driven on the basis of a pulse width modulation (PWM) control method. In this case, a light emitting state of each light source unit 511 can be controlled by a duty ratio in driving based on pulse width modulation.

The display device illustrated in FIG. 5 includes a backlight driving controller 520, a light source unit driver 530, and a liquid crystal display panel driver 540 as drivers for driving the liquid crystal display panel 500 and the backlight 510.

The backlight driving controller 520 controls on/off of the individual light source units 511 on the basis of pulse width modulation control. The light source unit driver 530 is provided for each light source unit 511 and turns on/off each light-emitting diode in a corresponding light source unit 511 on the basis of a control signal from the backlight driving controller 520.

The backlight driving controller 520 realizes local dimming of the backlight 510 by individually controlling a light emitting state of a light source unit 511 corresponding to each display area unit 502. Further, when the push-up technology is used, the backlight driving controller 520 also performs processing of distributing surplus power obtained by reducing output in light source units 511 of a dark part to light source units 511 of a bright part to cause the light source units 511 of the bright part to intensively emit light. For example, a display device that controls driving of each light source unit on the basis of an input signal corresponding to each display area unit may be proposed (refer to PTL 1). Although the backlight driving controller 520 controls a light emitting state of each light source unit 511 using an artificial intelligence function in the present embodiment, this will be described in detail later.

Figure 6:
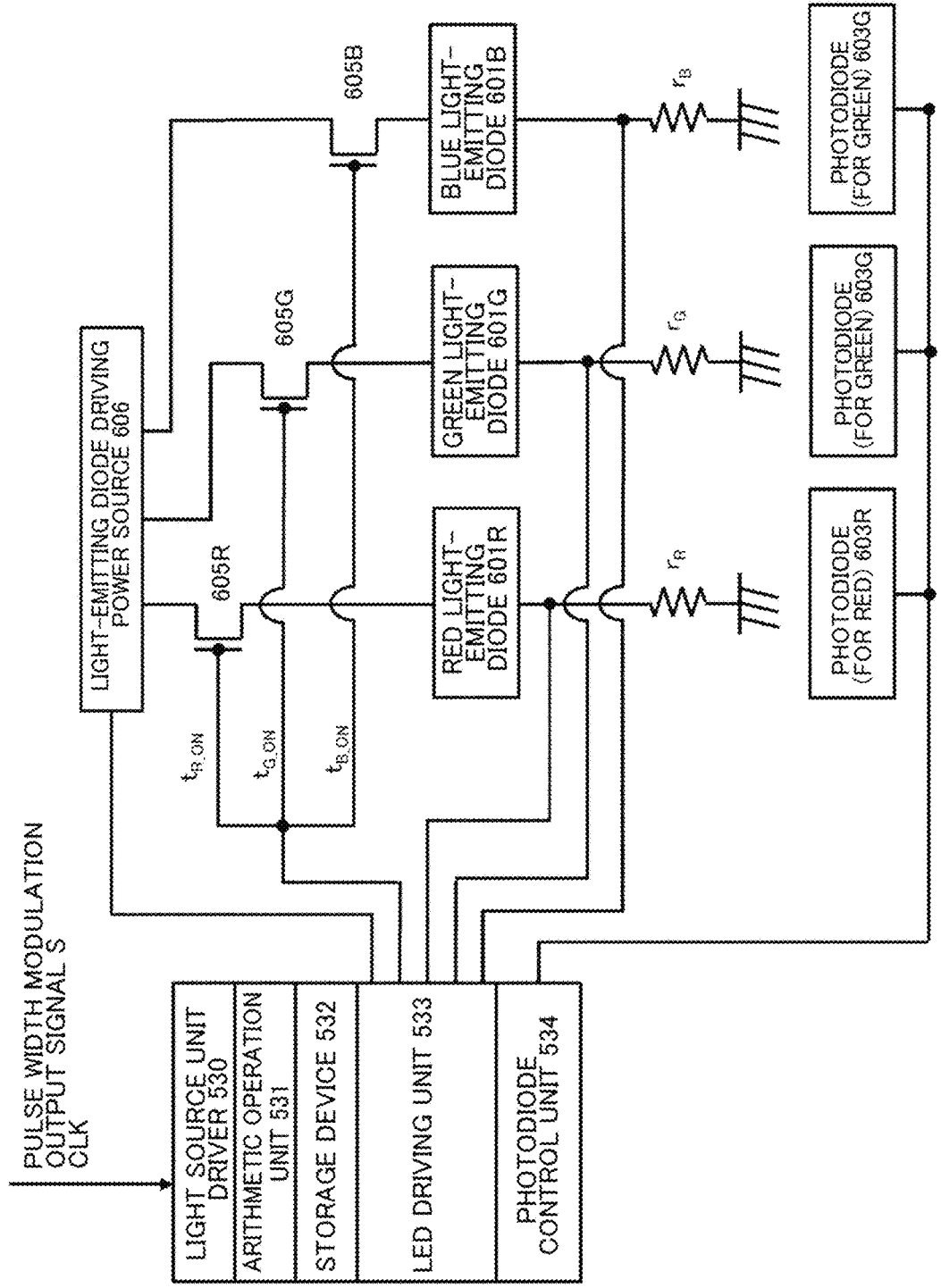
FIG. 6 is a diagram illustrating a configuration of a liquid crystal display panel 500, a backlight 510, and a driving unit thereof.

FIG. 6 illustrates a configuration example of a single light source unit 511 and a light source unit driver 530 that drives the light source unit 511. The light source unit 511 is composed of one set of a red-light-emitting diode 601R, a green-light-emitting diode 601G, and a blue-light-emitting diode 601B. In addition, the light source unit driver 530 includes an arithmetic operation unit 531, a storage device 532, an LED driving unit 533, a photodiode control unit 534, switching elements 605R, 605G, and 605B composed of field effect transistors (FETs), and a light-emitting diode driving power source (constant current source) 606.

In the present embodiment, the backlight driving controller 520 estimates a value of a pulse width modulation output signal for controlling a light emitting state of each light source unit 511 and each value of a clock signal CLK from a target display image displayed by the display unit 219 using an artificial intelligence function (a trained neural network model) and provides the estimated values to the storage device 532 of each light source unit driver 530. Meanwhile, it is assumed for convenience in the following description that a display image is an RGB image and the backlight driving controller 520 outputs pulse width modulation output signal values $S_R$, $S_G$, and $S_B$ for respective colors from the RGB signal. A display image may be an arbitrary color space such as HSV (Hue, Saturation, Lightness) and L*a*b. In addition, a neural network model may be configured to perform estimation processing for local dimming on the basis of a target display image and sensor information sensed by the sensor group 400. The arithmetic operation unit 531 determines on/off times of the red-light-emitting diode 601R, the green-light-emitting diode 601G, and the blue-light-emitting diode 601B constituting a corresponding light source unit 511 on the basis of the pulse width modulation output signal values $S_R$, $S_G$, and $S_B$ output from the storage device 532. Then, the LED driving unit 533 drives the switching elements 605R, 605G, and 605B on the basis of the on/off times determined by the arithmetic operation unit 531 and controls LED driving current flowing from the light-emitting diode driving power source 606 to the red-light-emitting diode 601R, the green-light-emitting diode 601G, and the blue-light-emitting diode 601B to control a corresponding display area unit 502 such that it is lit at a predetermined illuminance only for a desired on time.

The liquid crystal display panel driver 540 is configured as a known circuit such as a timing controller 541. The liquid crystal display panel 500 includes a gate driver, a source driver (both are not illustrated in FIG. 5), and the like for driving switching elements including thin film transistors (TFTs) constituting liquid crystal cells. A feedback mechanism in which light emitting states of the light-emitting diodes 601R, 601G, and 601B in a certain image frame are respectively measured by the photodiodes 603R, 603G, and 603B, outputs from the photodiodes 603R, 603G, and 603B are input to the photodiode control unit 534 and become data (signals) as luminance and chromaticity, for example, of the light-emitting diodes 601R, 601G, and 601B in the photodiode control unit 534 and the arithmetic operation unit 531, such data is transmitted to the LED driving unit 533, and light emitting states of the light-emitting diodes 601R, 601G, and 601B in the next image frame are controlled is formed.

In addition, resistors $r_R$, $r_G$, and $r_B$ for current detection are respectively inserted downstream the light-emitting diodes 601R, 601G, and 601B in series with respect to the light-emitting diodes 601R, 601G, and 601B. Then, currents flowing through the resistors $r_R$, $r_G$, and $r_B$ are converted into voltages, and the operation of the light-emitting diode driving power source 606 is controlled under the control of the LED driving unit 533 such that voltage drops in the resistors $r_R$, $r_G$, and $r_B$ become a predetermined value. Here, although only a single light-emitting diode driving power source (constant current source) 606 is illustrated in FIG. 6, light-emitting diode driving power sources 606 for driving the respective light-emitting diodes 601R, 601G, and 601B are provided in practice.

When local dimming of the display panel 500 is performed, the display area 501 composed of the pixels arranged in a matrix form is divided into P×Q display area units 502. If this state is represented as "rows" and "columns," it can be said that the display area 501 is divided into display area units 502 in Q rows×P columns. In addition, although each display area unit 502 is composed of a plurality of (M×N) pixels, if this state is represented as "rows" and "columns," it can be said that each display area unit 502 is composed of pixels N rows×M columns. Rows correspond to the first direction and columns correspond to the second direction in FIG. 5.

Each pixel is composed of one set of three sub-pixels of a red-light-emitting sub-pixel [R], a green-light-emitting sub-pixel [G], and a blue-light-emitting sub-pixel [B]. A luminance of each of the sub-pixels [R, G, B] can be gradation-controlled at $2^8$ levels of 0 to 255, for example, through 8-bit control. In this case, values $x_R$, $x_G$, and $x_B$ of input signals [R, G, B] input to the liquid crystal display panel driver 540 have values of $2^8$ levels. In addition, values $S_R$, $S_G$, $S_B$ of pulse width modulation output signals for controlling light emitting time of the red-light-emitting diode 601R, the green-light-emitting diode 601G, and the blue-light-emitting diode 601B constituting each light source unit 511 also have values of $2^8$ levels of 0 to 255. However, the present disclosure is not limited thereto, for example, 10-bit control can also be performed at $2^{10}$ levels of 0 to 1023 (representation of numerical values of 8 bits may be quadrupled, for example).

A control signal for controlling a light transmittance $L_t$ is supplied to each pixel from the liquid crystal display panel driver 540. Specifically, control signals [R, G, B] for controlling light transmittances $L_t$ of sub-pixels [R, G, B] are supplied from the liquid crystal display panel driver 540. That is, the control signal [R, G, B] are generated from the input signals [R, G, B] in the liquid crystal display panel driver 540 and supplied (output) to the sub-pixels [R, G, B]. Meanwhile, since light source luminance Y of the backlight 510 or the light source units 511 is changed for each image frame, the control signals [R, G, B] basically have values obtained by performing correction (compensation) based on change in the light source luminance Y on values obtained by performing γ correction on the values of the input signals [R, G, B]. In addition, the control signals [R, G, B] are transmitted from the timing controller 541 constituting the liquid crystal display panel driver 540 to the gate driver and the source driver (not illustrated) of the liquid crystal display panel 500, switching elements constituting the respective sub-pixels are driven on the basis of the control signals [R, G, B], and thus a desired voltage is applied to transparent electrodes constituting liquid crystal cells, to control the light transmittance (aperture ratio) $L_t$ of each sub-pixel. Here, as the values of the control signals [R, G, B] increase, the light transmittances $L_t$ of the sub-pixels [R, G, B] (aperture ratios of the sub-pixels) and luminance (display luminance y) of the sub-pixels [R, G, B] increase. That is, an image (normally, a kind of dots) configured by light that passes through the sub-pixels [R, G, B] is bright.

Control of the display luminance y and the light source luminance Y is performed for each image frame in image display of the display unit 219, for each display area unit, and for each light source unit. In addition, the operation of the liquid crystal display panel 500 is synchronized with the operation of the backlight 510 in an image frame.

When the display unit 219 is configured as the above-described liquid crystal display, the display area unit 502 becomes a minimum unit of local dimming because a light emitting state can be individually controlled for each light source unit 511.

On the other hand, in the case of a display device in which a light emitting state can be controlled in units of a pixel, such as an organic EL display and a self-emitting type display, a pixel can be a minimum unit of local dimming. In the case of this kind of display, individual pixels can be regarded as display area units and light source units. However, even in a display device in which a light emitting state can be controlled in units of a pixel, a screen may be divided into P×Q display area units 502 and local dimming of light emitting states may be performed in units of a display area unit (values of (P, Q) may be, for example, (19, 12)).

Figure 7:
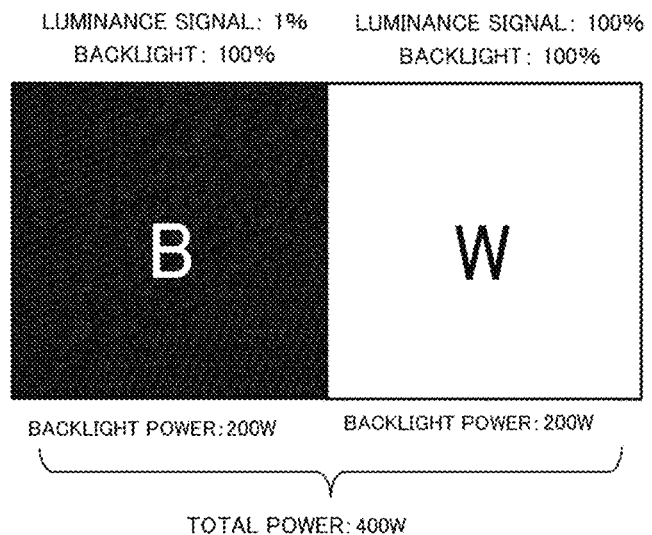
FIG. 7 is a diagram for explaining a local dimming and push-up technologies.
Figure 8:
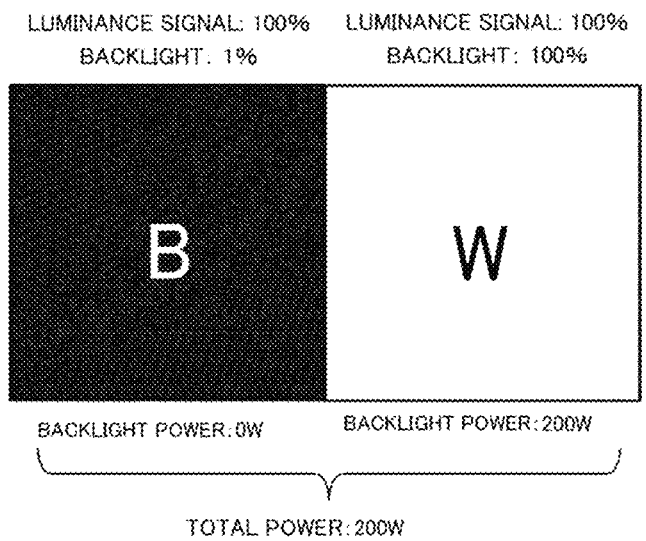
FIG. 8 is a diagram for explaining a local dimming and push-up technologies.
Figure 9:
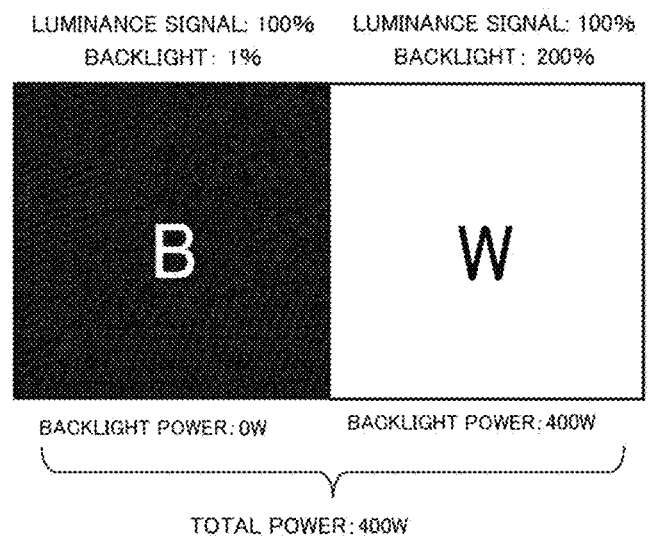
FIG. 9 is a diagram for explaining a local dimming and push-up technologies.

Subsequently, push-up operation will be described. FIG. 7 to FIG. 9 illustrate local dimming and push-up operation examples with respect to an input image including a black area having a luminance signal level of 1% as a dark part corresponding to the left half and a white area having a luminance signal level of 100% as a bright part corresponding to the right half for simplification.

In the example illustrated in FIG. 7, the image is drawn with a gain of the backlight 510 set to 100%, a luminance signal level of the dark part of the left half of the liquid crystal display panel 500 set to 1%, and a luminance signal level of the bright part of the right half set to 100% over the entire screen. In addition, maximum output power when the backlight 510 is turned on 100% over the entire screen is 400 W.

In the example illustrated in FIG. 8, when the image (including the black area having a luminance signal level of 1% as a dark part of the left half and the white area having a luminance signal level of 100% as a bright part of the right half) is drawn as in the FIG. 7, power of the backlight 510 is reduced by increasing the luminance signal of the black area of the left half. Specifically, the same luminance level is maintained even when the gain of light source units 511 corresponding to the left half in the backlight 510 is reduced to 1% by raising the luminance signal level of display area units 502 in the black area of the left half in the liquid crystal display panel 500 to 100%. On the other hand, the luminance signal level in the white area of the right half in the liquid crystal display panel 500 is maintained as 100% and the gain of light source units 511 corresponding to the right half in the backlight 510 is maintained as 100%. Since power of the left half of the backlight 510 becomes 1%, whole power becomes almost 200 W and thus is curbed to half of that in the operation example illustrated in FIG. 7.

The power of the backlight 510 may be a maximum of 400 W or less overall. Accordingly, surplus power obtained by saving power in the light source units 511 of the left half of the backlight 510 can be used for output of the light source units 511 of the right half, as illustrated in FIG. 8. In the example illustrated in FIG. 9, the luminance signal level of the display area units 502 in the black area of the left half in the liquid crystal display panel 500 is set to 100% and the gain of the light source units 511 of the left half in the backlight is set to 1%. That is, driving of the left half of the liquid crystal display panel 500 and the backlight 510 is the same as the example illustrated in FIG. 8. On the other hand, although the luminance signal level of the white area of the right half in the liquid crystal display panel 500 is 100%, the gain of the light source units 511 of the right half in the backlight 510 can be pushed up to 200%. Surplus power is obtained by increasing the luminance signal level in the dark part to curb output of the backlight, realizing the push-up. By combining the push-up technology with the local dimming technology in this manner, a high-luminance dynamic range is improved about twice. Furthermore, the whole power of the backlight 510 can be controlled such that it does not exceed a maximum of 400 W.

D. Local Dimming and Push-Up Control Using Artificial Intelligence Function

It is possible to enhance the effect of power consumption reduction and picture quality improvement by applying the local dimming technology to a display device used for the display unit 219. Furthermore, it is possible to realize a high dynamic range (while maintaining constant output power of the entire backlight) by pushing up the output of a backlight of a bright part using surplus power obtained by increasing a luminance signal level of a dark part to curb the output of the backlight using the push-up technology.

Basically, it is possible to increase the contrast of an entire video by brightening up a light source unit of a display area unit having a bright video and dimming a light source unit of a dark display area unit. For example, a display device that controls a light emitting state of a light source unit corresponding to a display area unit on the basis of a maximum input signal in display area units having a maximum value among input signals corresponding to respective display area units has been proposed. Specifically, the display device is configured to check whether an average of all input signals is equal to or greater than a predetermined value, to set an exponent in γ correction of an input signal corresponding to each display area unit to $\gamma_{21}$ and control a luminance of a light source unit corresponding to the corresponding display area unit to a luminance based on a value of a maximum input signal in the display area units if the average of all input signals is equal to or greater than the predetermined value, to set an exponent in γ correction of an input signal corresponding to a display area unit in which a value of a maximum input signal is equal to or greater than a specified value in the display area units to $\gamma_{22}$ (where $\gamma_{22} > \gamma_{21}$) and control a luminance of a light source unit corresponding to the display area unit to a luminance higher than the luminance based on the value of the maximum input signal in the display area units if the average of all input signals is less than the predetermined value, and to set an exponent in γ correction of an input signal corresponding to a display area unit in which the value of the maximum input signal is less than the specified value in the display area units to $\gamma_{21}$ and control a luminance of a light source unit corresponding to the display area unit to the luminance based on the value of the maximum input signal in the display area units (refer to PTL 1).

To obtain an optimal solution of a local dimming pattern, it is necessary to perform recursive calculation all the time. For example, it is necessary to observe a plurality of image frames in the time direction and search for an optimal light emitting pattern (hereinafter also referred to as "local dimming pattern") for locally dimming each light source unit 110 in the time direction. Accordingly, it is difficult to calculate an optimal solution of a local dimming pattern in units of a frame in real time.

In addition, when a plurality of display area units (hereinafter also referred to as "white points") having a bright video are present in a single image frame, there is a problem that picture quality deterioration occurs due to crosstalk that white points affect each other when local dimming has been performed. Accordingly, it is necessary to optimize one white point, subsequently optimize the other white point, and then additionally repeatedly perform optimization calculation on one white point. Further, light emitting characteristics of the P×Q light source units 511 constituting the backlight 510 are not identical due to individual unevenness of light sources themselves or light source units. In addition, since light source units closer to an end are strongly affected by reflection at the end, the influence on the display area 501 differs according to a place where the light source units are disposed. Furthermore, a local dimming pattern needs to be calculated in consideration of an optical diffusion model representing the entire system because of the influence of characteristics according to optical films and the like of the liquid crystal panel. From this point of view, it is also difficult to calculate an optimal solution of a local dimming pattern in units of a frame in real time.

There is also a problem that a mathematically calculated optimal solution of a local dimming pattern is not always optimal when observed by a person. This is because there are physiological or perceptual individual differences and, additionally, characteristics of a display device and the influence of an environment in which images are watched are also conceived. In addition, it is assumed that the picture quality or appearance of a display screen on which local dimming has been performed is affected by various factors, such as a content type, characteristics of a display device, a video watching environment, taste and attributes of a user watching video content, and physiological characteristics, as well as an input video signal.

On the other hand, there is concern that a time in which the panel is locally heated continues to cause panel deterioration although the picture quality of a display image is improved according to local dimming using push-up. In such a case, it is necessary to curb push-up from the viewpoint of protection of the device rather than improvement of picture quality. For example, when a condition that there is no deviation in integrated radiation times of the respective light source units 511 is added to conditions, it is more difficult to calculate an optimal solution of a local dimming pattern in units of a frame in real time.

Although a more optimal solution can be derived if a local dimming pattern is calculated in consideration of various factors, real-time calculation becomes more difficult. Eventually, there is no choice but to perform local dimming with a compromised approximate solution.

Accordingly, the present description proposes a technology for deriving an optimal luminance of each light source unit for performing local dimming and push-up for each display area unit of a display device in real time using an artificial intelligence function while considering various factors. Specifically, the backlight driving controller 520 controls a light emitting state of each light source unit 511 using the artificial intelligence function.

Here, the artificial intelligence function may indicate, for example, a function obtained by artificially realizing the general function of the human brain, such as learning, estimation, data creation, and planning, according to software or hardware. In addition, an artificial intelligence server may be equipped with, for example, a neural network that performs deep learning (DL) according to a model imitating the human brain nerve circuit. A neural network includes a mechanism in which artificial neurons (nodes) forming a network according to coupling of synapses obtain an ability to solve problems while changing coupling intensity of synapses according to learning. A neural network can automatically estimate a rule of solving problems by repeating learning.

It is possible to train a model such that requested functions can be provided by applying a large amount of training data to an artificial intelligence function composed of a neural network and performing deep learning and to develop a device including the artificial intelligence function which operates according to the trained model. Further, it is possible to develop a device having an artificial intelligence function capable of extracting characteristics that cannot be imagined by a developer from a lot of data and solving complicated problems for which the developer cannot conceive an algorithm through training such as deep learning.

In the present embodiment, it is possible to obtain an optimal solution of a local dimming pattern for each frame in real time by using an artificial intelligence function for local dimming of a display device, that is, individual luminance control for each display area unit. In addition, by using the artificial intelligence function, it is expected to be able to realize more ideal local dimming and push-up control by extracting correlations between various factors, such as a content type, characteristics of a display device, a video watching environment, taste and attributes of a user watching video content, and physiological characteristics, and an ideal luminance of each light source unit, which cannot be imagined by a developer and a viewer through training of deep learning or the like.

D-1. Configuration Example of Artificial Intelligence Function (1)

Figure 10:
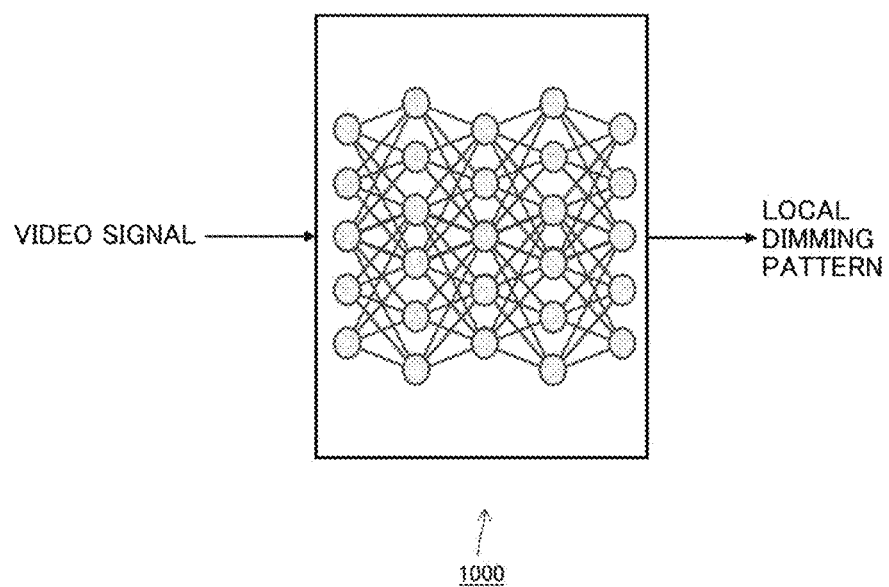
FIG. 10 is a diagram illustrating a first configuration example 1000 of a neural network used to estimate a local dimming pattern.

FIG. 10 illustrates a first configuration example 1000 of a neural network used to estimate a local dimming pattern. Although the neural network 1000 is assumed to be disposed in the backlight driving controller 520 in the liquid crystal display panel 500 (as the display unit 219), it may be incorporated in the video compositing unit 218. The illustrated neural network 1000 includes an input layer, middle layer, and an output layer. It is desirable that the middle layer of the neural network 1000 be composed of a plurality of middle layers and the neural network 1000 be able to perform deep learning. Meanwhile, a recurrent neural network (RNN) structure including recurrent coupling in middle layers may be employed in consideration of time-series information such as a video stream.

The neural network 1000 performs deep learning on a correlation between a video signal corresponding to a target display image and local dimming (a light emitting state of each light source unit 511) in advance. In the example illustrated in FIG. 10, the neural network 1000 may receive, for example, a video signal including RGB signals for each pixel and calculate a local dimming pattern that is optimal when the video signal is displayed as a screen on the display unit 219.

Meanwhile, the neural network 1000 may receive information used in the video decoder 208 as well as a video signal decoded by the video decoder 208 (the same applies to other neural networks which will be described later). This is because, although intermediate signals in the decoder are lost in a process of decoding processing, information useful for processing of calculating a local dimming pattern is likely to be included in the intermediate signals. Specifically, the apparatus state sensor unit 440 detects quantization coefficients and other coding parameters, motion vectors, and the like in the video decoder 208 and inputs the detected information to the neural network 1000 along with the video signal.

In addition, the neural network 1000 may receive subtitle information and caption information output from the subtitle decoder 210 and the caption decoder 211 along with the video signal decoded by the video decoder 208 (the same applies to other neural networks which will be described later). Although text information such as caption is white, it is not necessary to set a high luminance for the text information according to local dimming and additionally perform push-up, and thus the neural network 1000 may calculate an optimal local dimming pattern and a push-up amount in consideration of text information such as caption. For example, subtitle information and caption information can be input to the neural network 1000 from the caption compositing unit 212. Alternatively, the neural network 1000 may learn correlations between video signals and subtitle information and caption information in advance and estimate subtitle information and caption information included in a video from a video signal input to the input layer. In addition, it is not necessary to perform push-up on OSD (On Screen Display) generated by the main control unit 201 and the like, like text information. Accordingly, the neural network 1000 may calculate an optimal local dimming pattern and a push-up amount in consideration of display information of OSD (the same applies to other neural networks which will be described later). The neural network 1000 may receive display information of OSD from the main control unit 201 and the like or learn correlations between video signals and OSD in advance and estimate OSD superposed on a video from a video signal.

In addition, it is conceivable that metadata such as a content type affects optimization of local dimming and push-up. In a case where content is a movie and a case in which content is sports, optimal local dimming and push-up patterns may be different. Further, even in the case of the same videos of sports, it is conceivable that optimal local dimming and push-up patterns are different in a case of broadcasting of a game and in a case of a sports scene in a play. Accordingly, the apparatus state sensor unit 440 or the like may detect information about a content type and input the detected information to the neural network 1000 along with a video signal (the same applies to other neural networks which will be described later). Specifically, metadata associated with content may be input to the input layer of the neural network 1000.

Alternatively, the neural network 1000 may learn correlations between video signals and audio signals and metadata of content in advance and estimate metadata from a video signal and an audio signal input to the input layer (in cases in which the neural network is configured to receive both a video signal and an audio signal).

The neural network 1000 may output, for example, an optimal light emitting state for each light source unit as a local dimming pattern. A local dimming pattern calculated by the neural network 1000 is output to each light source unit driver 530. Accordingly, when the television reception device 100 receives a video stream such as television broadcasting and displays the video streams as a screen on the display unit 219, the neural network 1000 can output an optimal solution of a local dimming pattern which can achieve picture quality improvement such as a high dynamic range for each frame in real time while curbing deterioration of devices such as the light source units 511 on the basis of the video signal displayed as the screen.

D-2. Configuration Example of Artificial Intelligence Function (2)

Figure 11:
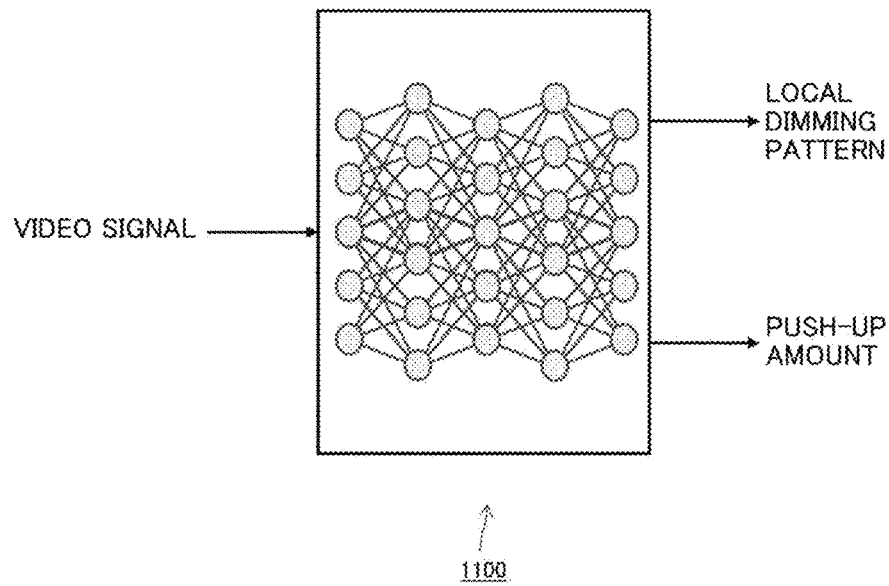
FIG. 11 is a diagram illustrating a second configuration example 1200 of a neural network used to estimate a local dimming pattern.

FIG. 11 illustrates a second configuration example 1100 of a neural network used to estimate a local dimming pattern. Although the neural network 1100 is assumed to be disposed in the backlight driving controller 520 in the liquid crystal display panel 500 (as the display unit 219), it may be incorporated in the video compositing unit 218. The illustrated neural network 1100 includes an input layer, middle layer, and an output layer. It is desirable that the middle layer of the neural network 1100 be composed of a plurality of middle layers and the neural network 1100 be able to perform deep learning. Meanwhile, an RNN structure including recurrent coupling in middle layers may be employed in consideration of time-series information such as a video stream.

The neural network 1100 performs deep learning on a correlation between a video signal corresponding to a target display image and local dimming (a light emitting state of each light source unit 511) and a push-up amount (a push-up amount for each pixel or each display area) in advance. In the example illustrated in FIG. 11, the neural network 1100 may receive, for example, a video signal including RGB signals for each pixel and calculate a local dimming pattern and a push-up amount that are optimal when the video signal is displayed as a screen on the display unit 219. The neural network 1100 may output, for example, an optimal light emitting state for each light source unit as a local dimming pattern. In addition, although the neural network 1100 outputs an optimal push-up amount for each pixel, the neural network 1100 may calculate and output a push-up amount in units of a predetermined pixel group such as a display area. A local dimming pattern calculated by the neural network 1100 is output to each light source unit driver 530. In addition, the neural network 1100 outputs the calculated push-up amount to the liquid crystal display panel driver 540. Accordingly, when the television reception device 100 receives a video stream such as television broadcasting and displays the video streams as a screen on the display unit 219, the neural network 1100 can output optimal solutions of a local dimming pattern and a push-up amount which can improve picture quality for each frame in real time while curbing deterioration of devices such as the light source units 511 on the basis of the video signal displayed as the screen.

D-3. Configuration Example of Artificial Intelligence Function (3)

Figure 12:
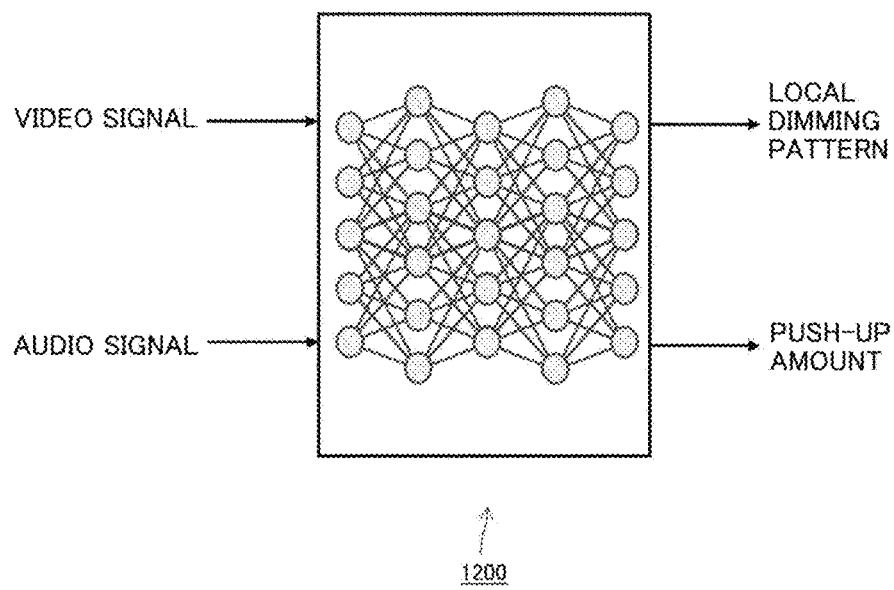
FIG. 12 is a diagram illustrating a third configuration example 1200 of a neural network used to estimate a local dimming pattern.

FIG. 12 illustrates a third configuration example 1200 of a neural network used to estimate a local dimming pattern. Although the neural network 1200 is assumed to be disposed in the backlight driving controller 520 in the liquid crystal display panel 500 (as the display unit 219), it may be incorporated in the video compositing unit 218. The illustrated neural network 1200 includes an input layer, middle layer, and an output layer. It is desirable that the middle layer of the neural network 1200 be composed of a plurality of middle layers and the neural network 1200 be able to perform deep learning. Meanwhile, an RNN structure including recurrent coupling in middle layers may be employed in consideration of time-series information such as a video stream and an audio stream.

The neural network 1200 performs deep learning on a correlation between a video signal corresponding to a target display image and an audio signal synchronized with the video signal, and local dimming (a light emitting state of each light source unit 511) and a push-up amount (a push-up amount for each pixel or each display area) in advance. In the example illustrated in FIG. 12, the neural network 1200 may receive, for example, a video signal including RGB signals for each pixel and an audio signal synchronized with the video signal and calculate a local dimming pattern and a push-up amount that are optimal when the video signal is displayed as a screen on the display unit 219. Meanwhile, the neural network 1000 may also receive information used in the video decoder 208 and the audio decoder 209 as well as a video signal and an audio signal decoded by the video decoder 208 and the audio decoder 209. This is because, although intermediate signals in the decoder are lost in a process of decoding processing, information useful for processing of calculating a local dimming pattern is likely to be included in the intermediate signals. The apparatus state sensor unit 440 detects data generated in processes of decoding processing in the video decoder 208 and the audio decoder 209 and inputs the detected data to the input layer of the neural network 1200 along with a video signal and an audio signal.

The neural network 1200 can optimize the local dimming pattern and the push-up amount on the basis of the audio signal in addition to the video signal. By controlling local dimming and push-up using the neural network 1200, it is possible to give visual effects matching sound by extending a luminance dynamic range, for example, in a scene in which performers are disputing in a video or intense BGM to which an effect has been applied is being played and curbing a luminance dynamic range in a silent scene.

The neural network 1200 may output, for example, an optimal light emitting state for each light source unit as a local dimming pattern. In addition, although the neural network 1200 outputs an optimal push-up amount for each pixel, the neural network 1200 may calculate and output an optimal push-up amount in units of a predetermined pixel group such as a display area. A local dimming pattern calculated by the neural network 1200 is output to each light source unit driver 530. In addition, the neural network 1200 outputs the calculated push-up amount to the liquid crystal display panel driver 540. Accordingly, when the television reception device 100 receives a video stream such as television broadcasting and displays the video streams as a screen on the display unit 219, the neural network 1200 can output optimal solutions of a local dimming pattern and a push-up amount which can improve picture quality for each frame in real time while curbing deterioration of devices such as the light source units 511 on the basis of the video signal displayed as the screen.

D-4. Configuration Example of Artificial Intelligence Function (4)

Figure 13:
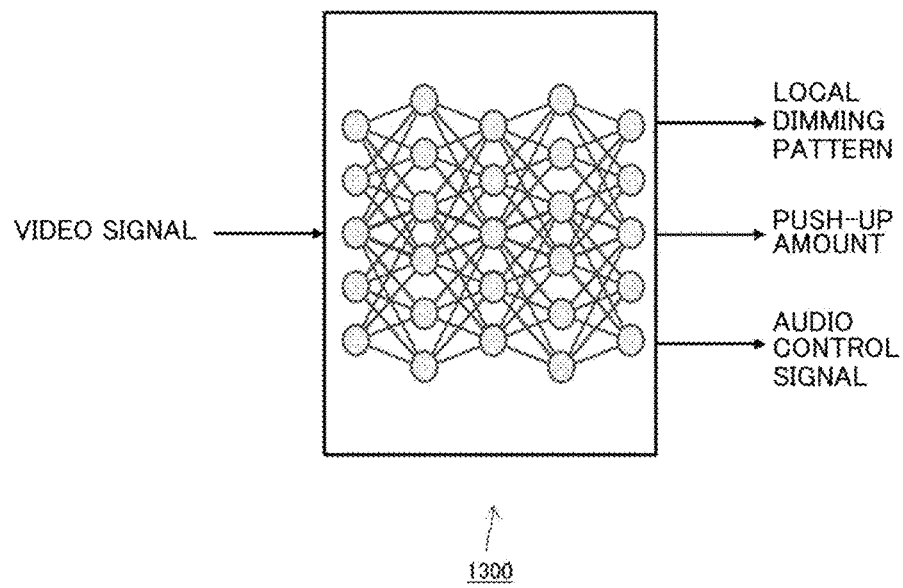
FIG. 13 is a diagram illustrating a fourth configuration example 1300 of a neural network used to estimate a local dimming pattern.

FIG. 13 illustrates a fourth configuration example 1300 of a neural network used to estimate a local dimming pattern. Although the neural network 1300 is assumed to be disposed in the backlight driving controller 520 in the liquid crystal display panel 500 (as the display unit 219), it may be incorporated in the video compositing unit 218. The illustrated neural network 1300 includes an input layer, middle layer, and an output layer. It is desirable that the middle layer of the neural network 1300 be composed of a plurality of middle layers and the neural network 1300 be able to perform deep learning. Meanwhile, an RNN structure including recurrent coupling in middle layers may be employed in consideration of time-series information such as a video stream.

The neural network 1300 performs deep learning on a correlation between a video signal corresponding to a target display image, local dimming (a light emitting state of each light source unit 511) and a push-up amount (a push-up amount for each pixel or each display area), and an audio control signal in advance. In the example illustrated in FIG. 13, the neural network 1300 may receive, for example, a video signal including RGB signals for each pixel, calculate a local dimming pattern and a push-up amount that are optimal when the video signal is displayed as a screen on the display unit 219, and calculate an audio control signal suitable for the local dimming and push-up amount. The neural network 1300 may output, for example, an optimal light emitting state for each light source unit as a local dimming pattern. In addition, although the neural network 1300 outputs an optimal push-up amount for each pixel, the neural network 1300 may calculate and output an optimal push-up amount in units of a predetermined pixel group such as a display area.

A local dimming pattern calculated by the neural network 1300 is output to each light source unit driver 530. In addition, the neural network 1300 outputs the calculated push-up amount to the liquid crystal display panel driver 540. Accordingly, when the television reception device 100 receives a video stream such as television broadcasting and displays the video streams as a screen on the display unit 219, the neural network 1300 can output optimal solutions of a local dimming pattern and a push-up amount which can improve picture quality for each frame in real time while curbing deterioration of devices such as the light source units 511 on the basis of the video signal displayed as the screen.

In addition, the audio control signal calculated by the neural network 1300 is output to the audio compositing unit 220. The audio control signal mentioned here includes audio signal processing such as sound quality improvement and noise removal such as high resolution, audio signal processing such as sound quality deterioration and noise addition, or the like. It is possible to simultaneously improve auditory effects and visual effects when content such as television broadcasting is watched through the television reception device 100 by performing local dimming and push-up to also adjust sound quality of audio such that it is suitable for picture quality improvement.

D-5. Configuration Example of Artificial Intelligence Function (5)

Figure 14:
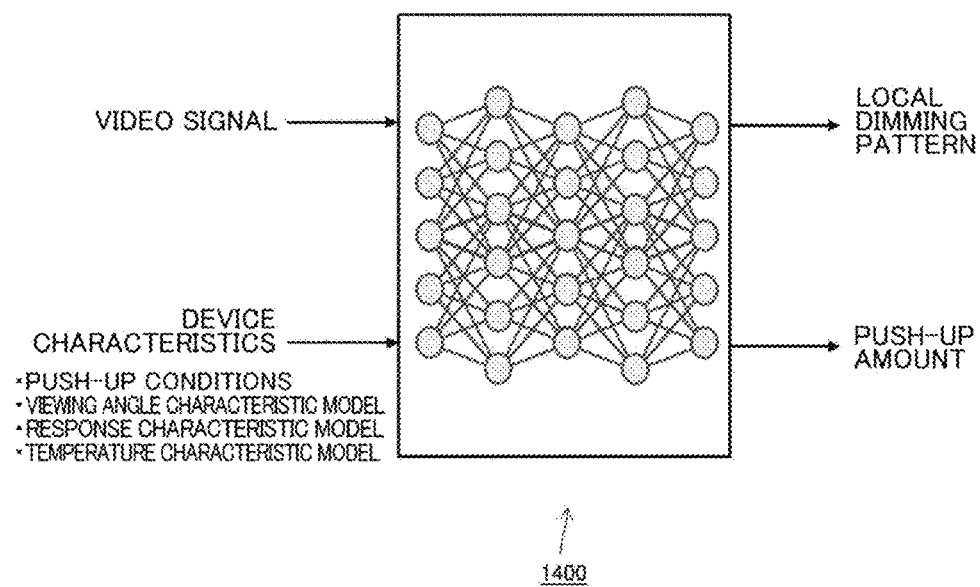
FIG. 14 is a diagram illustrating a fifth configuration example 1400 of a neural network used to estimate a local dimming pattern.

FIG. 14 illustrates a fifth configuration example 1400 of a neural network used to estimate a local dimming pattern. Although the neural network 1400 is assumed to be disposed in the backlight driving controller 520 in the liquid crystal display panel 500 (as the display unit 219), it may be incorporated in the video compositing unit 218. The illustrated neural network 1400 includes an input layer, middle layer, and an output layer. It is desirable that the middle layer of the neural network 1400 be composed of a plurality of middle layers and the neural network 1400 be able to perform deep learning. Meanwhile, an RNN structure including recurrent coupling in middle layers may be employed in consideration of time-series information such as a video stream.

The neural network 1400 performs deep learning on a correlation between a video signal corresponding to a target display image and device characteristics, and local dimming (a light emitting state of each light source unit 511) and a push-up amount (a push-up amount for each pixel or each display area) in advance. In the example illustrated in FIG. 14, the neural network 1400 may receive, for example, a video signal including RGB signals for each pixel and information about device characteristics of a device (the display unit 219 or the liquid crystal display panel 500) that displays the video signal and calculate a local dimming pattern and a push-up amount that are optimal when the video signal is displayed as a screen.

An example of the device characteristics is push-up conditions of the liquid crystal display panel 500. Although push-up is a technology of distributing surplus power obtained by curbing power in a dark part of the display area 501 to a region having a high signal level to cause the region to intensively emit light, it is necessary to perform push-up in consideration of conditions such as a push-up magnification, temperature characteristics, and the like. When push-up is performed, the display area 501 is locally becomes a high temperature and only the corresponding part deteriorates, and thus push-up needs to be curbed. In addition, since the luminance reaches an upper limit to becomes a saturation state when push-up is performed and a luminance beyond the upper limit cannot be represented due to restriction on a luminance dynamic range in hardware of the liquid crystal display panel 500, it is necessary to perform push-up in consideration of even a saturation level. Accordingly, in the liquid crystal display panel 500, these conditions with respect to push-up are input to the input layer of the neural network 1400.

In addition, since various other hardware characteristics of the display unit 219 in which local dimming and push-up are performed also affect optimization of a local dimming and push-up pattern, these may be input to the input layer of the neural network 1400 as device characteristics. For example, when the display unit 219 is a liquid crystal display panel, a viewing angle is narrow, there is temperature dependency of liquid crystal, and response characteristics differ according to panel type and the like, in general, and thus it is necessary to perform local dimming and push-up in consideration of various device characteristic models such as a viewing angle characteristic model, a response characteristic model, and a temperature characteristic model. Further, it is necessary to perform local dimming and push-up in consideration of response characteristics and temperature characteristics for each color. Accordingly, the aforementioned device characteristics with respect to the display unit 219 are input to the input layer 1010 of the neural network 1000.

The apparatus state sensor unit 440 may read the device characteristics of the display unit 219, for example, from the ROM or another storage area in the main control unit 201 and input the device characteristics to the neural network 1400. Of course, such sensor information may be supplied by a means other than the apparatus state sensor unit 400.

The neural network 1400 may output, for example, an optimal light emitting state for each light source unit as a local dimming pattern. In addition, although the neural network 1400 outputs an optimal push-up amount for each pixel, the neural network 1400 may calculate and output an optimal push-up amount in units of a predetermined pixel group such as a display area. A local dimming pattern calculated by the neural network 1400 is output to each light source unit driver 530. In addition, the neural network 1400 outputs the calculated push-up amount to the liquid crystal display panel driver 540. Accordingly, when the television reception device 100 receives a video stream such as television broadcasting and displays the video streams as a screen on the display unit 219, the neural network 1400 can output optimal solutions of a local dimming pattern and a push-up amount which can improve picture quality for each frame in real time while curbing deterioration of devices such as the light source units 511 on the basis of the video signal displayed as the screen and the device characteristics of the display unit 219.

D-6. Configuration Example of Artificial Intelligence Function (6)

Figure 15:
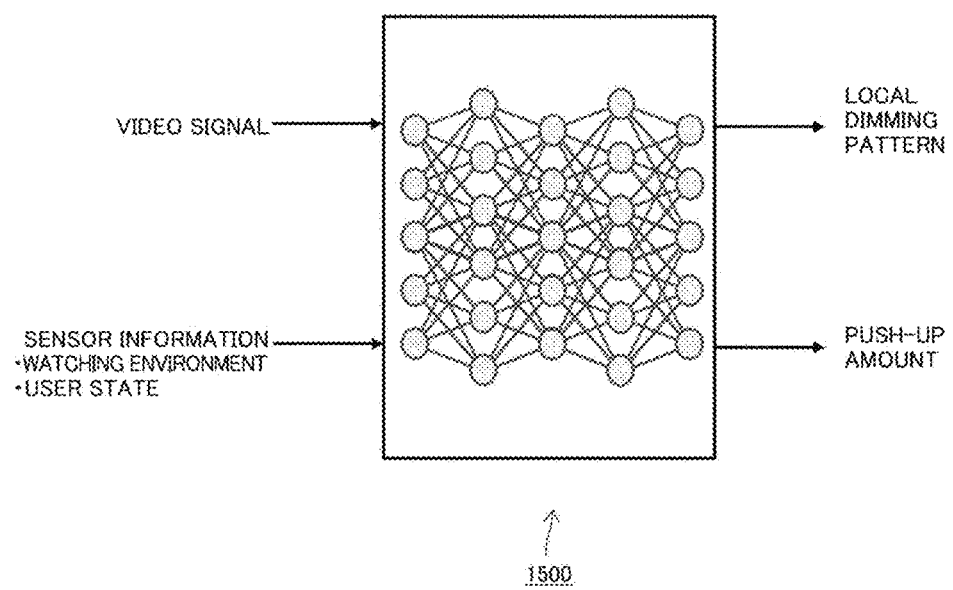
FIG. 15 is a diagram illustrating a sixth configuration example 1500 of a neural network used to estimate a local dimming pattern.

FIG. 15 illustrates a sixth configuration example 1500 of a neural network used to estimate a local dimming pattern. Although the neural network 1500 is assumed to be disposed in the backlight driving controller 520 in the liquid crystal display panel 500 (as the display unit 219), it may be incorporated in the video compositing unit 218. The illustrated neural network 1500 includes an input layer, middle layer, and an output layer. It is desirable that the middle layer of the neural network 1500 be composed of a plurality of middle layers and the neural network 1500 be able to perform deep learning. Meanwhile, an RNN structure including recurrent coupling in middle layers may be employed in consideration of time-series information such as a video stream.

The neural network 1500 performs deep learning on a correlation between sensor information detected by the sensor group 400 and local dimming (a light emitting state of each light source unit 511) and a push-up amount (a push-up amount for each pixel or each display area)1 in advance. In the example illustrated in FIG. 14, the neural network 1500 may receive, for example, a video signal including RGB signals for each pixel and sensor information and calculate a local dimming pattern and a push-up amount that are optimal when the video signal is displayed as a screen. The sensor information mentioned here is information obtained by detecting a watching environment in which a user watches a television program, a state of the user himself/herself watching the television program, and the like.

A television watching environment may be, for example, an environment of a room in which the television reception device 100 is installed. Particularly, indoor lighting, and the intensity, an incidence angle on a screen, and the color of natural light incident from a window largely affect optimization of a local dimming pattern and a push-up amount. The environmental sensor unit 430 acquires sensor information about indoor lighting and natural light and provides the sensor information to the input layer of the neural network 1500.

In addition, it is conceivable that reflection (the intensity of reflected light, a reflection angle, and the color of the reflected light) of the aforementioned indoor lighting and natural light from the screen of the display unit 219 also affect optimization of local dimming and push-up. Accordingly, the environmental sensor unit 430 detects reflection from the screen of the display unit 219 and provides the reflection to the input layer of the neural network 1000.

Mathematically calculated optimal solutions with respect to local dimming and push-up are not necessarily optimal when observed by a person. Accordingly, sensor information about a viewer (user) is also input to the neural network 1500.

For example, optimal solutions of local dimming and push-up may depend on the number of persons who simultaneously watch the television reception device 100, the position and posture of each person. When a plurality of users watch a television program together, there are cases in which a local dimming and push-up pattern satisfactory for all persons is desirable rather than a local dimming and push-up pattern optimal for a specific person. Accordingly, a video signal obtained by capturing a user who is watching content using the camera 411 is input to the neural network 1500. Alternatively, distance and angle information of each user based on a distance sensor included in the environmental sensor unit 430 may be input to the neural network 1500.

In addition, optimal solutions of local dimming and push-up may vary according to whether a user has naked eyes or wears glasses even if the user is at the same position. The neural network 1000 can estimate whether a user wears glasses from a video signal obtained by capturing the user who is watching content using the camera 411. Alternatively, user profile information detected by the user profile sensor unit 450 may be input to the neural network 1000.

In addition, it is conceived that mathematical optimal solutions of local dimming and push-up differ from optimal solutions preferred by a user. Accordingly, optimal solutions preferred by the user also depend on the sex, age, taste, and other personal attributes of the user (e.g., a cheerful user likes audacious push-up, but a quiet and gentle user may curb push-up). Therefore, the neural network 1500 may estimate optimal solutions of local dimming and push-up for each user on the basis of user profiles received from the user profile sensor unit 450.

In addition, it is also conceivable that optimal solutions of local dimming and push-up depend on physiological or perceptual factors of a user, such as the eyesight (including dynamic visual acuity), contrast sensitivity, and flicker sensitivity. Accordingly, biometric information of a user detected by the user state sensor unit 420 is provided to the input layer of the neural network 1500.

There are cases in which local dimming and push-up that a user likes can be estimated according to an operation performed by the user on the television reception device 100. For example, when a user has performed settings such as "contrast preferred" and "picture quality improvement" through a UI screen of the television reception device 100, push-up may be actively performed using surplus power according to local dimming. Accordingly, the apparatus state sensor unit 440 detects operations such as UI settings performed by a user on the television reception device 100 and other apparatuses and provides the operations to the input layer of the neural network 1500.

E. Learning of Neural Network

In the aforementioned section D, the configurations of neural networks used to estimate a local dimming pattern and a push-up amount in the display unit 219 have been described. In this section, a learning method of a neural network will be described. Although supervised learning, unsupervised learning, and reinforcement learning may be conceived as a learning method of a neural network, in general, supervised learning and unsupervised learning will be described below.

E-1. Supervised Learning of Neural Network

Figure 16:
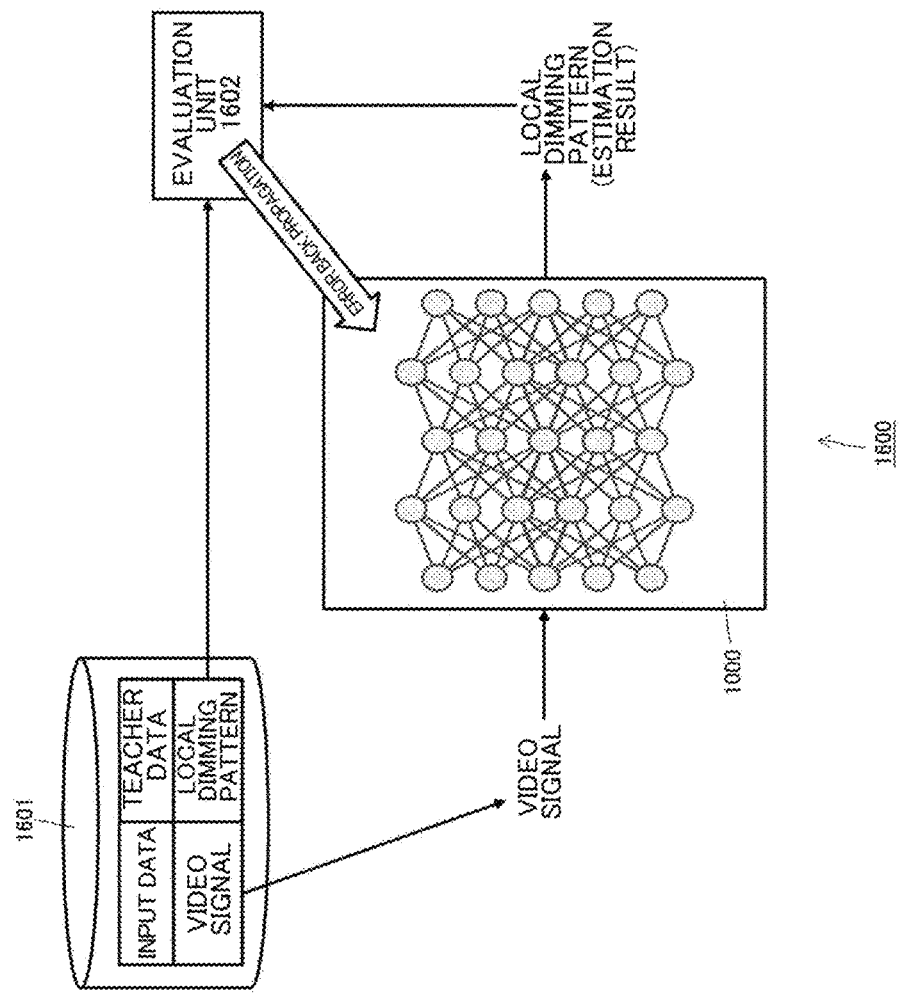
FIG. 16 is a diagram illustrating a configuration example of a supervised learning system 1600.

FIG. 16 schematically illustrates a configuration example of a supervised learning system 1600 that performs supervised learning of the neural network 1000 that estimates a local dimming pattern optimal for a video signal corresponding to a target display image as illustrated in FIG. 10.

Massive learning data 1601 composed of a combination of input data to the neural network 1000 that is a learning target and teacher data for output of the neural network 1000 is generated in advance off-line. The input data mentioned here is a video signal of a target display image displayed by the liquid crystal display panel 500 equipped with the neural network 1000. In addition, the teacher data is a local dimming pattern of the backlight 510 optimized for the video signal.

When the video signal is input, the neural network 1000 estimates and outputs an optimal local dimming pattern corresponding to the video signal. An evaluation unit 1602 calculates a loss function defined on the basis of an error between the local dimming pattern that is the estimation result of the neural network 1000 and a local dimming pattern as teacher data corresponding to the input video signal, feeds back the loss function to the neural network 1000, performs learning of the neural network 1000 such that the loss function is minimized according to error back propagation.

Meanwhile, when supervised learning of the neural network 1100 that estimates a local dimming pattern and a push-up amount optimal for a video signal corresponding to a target display image, as illustrated in FIG. 11, is performed, teacher data composed of a local dimming pattern and a push-up amount corresponding to the video signal that is input data is generated off-line. Then, learning of the neural network 1100 may be performed such that a loss function defined on the basis of each error between the local dimming pattern and the push-up amount that are estimation results of the neural network 1100 and the local dimming pattern and the push-up amount as the teacher data corresponding to the input video signal is minimized as above.

Figure 17:
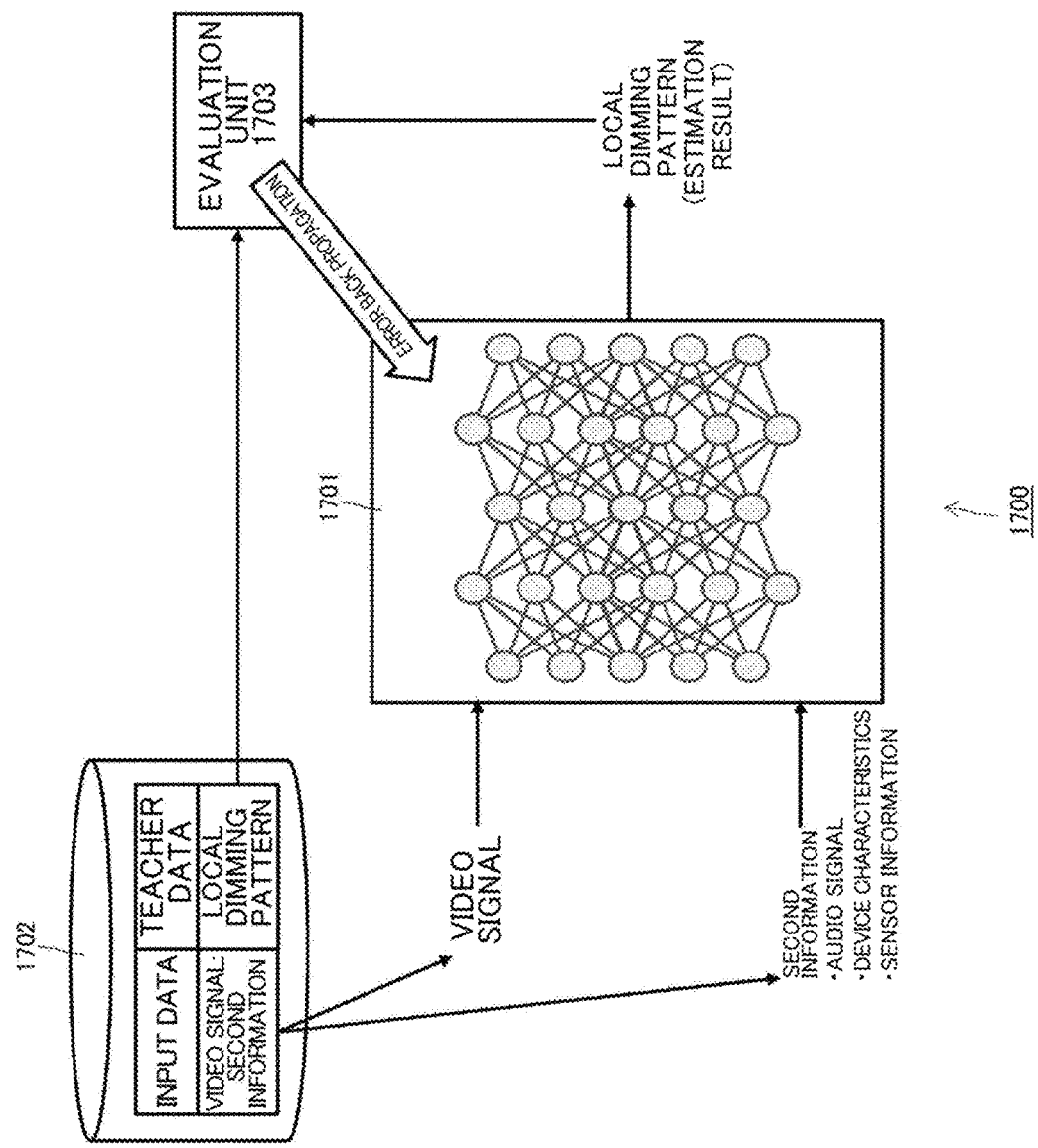
FIG. 17 is a diagram illustrating a configuration example of a supervised learning system 1700.

FIG. 17 schematically illustrates a configuration of a supervised learning system 1700 that performs supervised learning of a neural network 1701 that estimates a local dimming pattern optimal for a video signal and second information.

Massive learning data 1702 composed of a combination of input data to the neural network 1701 that is a learning target and teacher data for output of the neural network 1701 is generated in advance off-line. The input data mentioned here is a combination of a video signal of a target display image and the second information displayed by the liquid crystal display panel 500 equipped with the neural network 1701. In addition, the teacher data is a local dimming pattern of the backlight 510 optimized for the video signal. Meanwhile, when the neural network 1701 estimates a local dimming pattern and a push-up amount, a local dimming pattern and a push-up amount optimized for a combination of the video signal and the second information may be used.as teacher data.

The second information is information that is likely to affect optimization of a local dimming pattern other than video signals. Specifically, the second information is at least one of an audio signal synchronized with an input video signal, device characteristics (push-up conditions, a viewing angle characteristic model, a response characteristic model, a temperature characteristic model, and the like) of the liquid crystal display panel 500 that displays the video signal, sensor information (a watching environment, a user state, apparatus operation information, and the like) or a combination of at least two thereof.

When the data composed of the combination of the video signal and the second information is input, the neural network 1701 estimates and outputs an optimal local dimming pattern corresponding thereto. An evaluation unit 1703 calculates a loss function defined on the basis of an error between the local dimming pattern that is the estimation result of the neural network 1701 and a local dimming pattern as teacher data corresponding to the input video signal, feeds back the loss function to the neural network 1701, performs learning of the neural network 1701 such that the loss function is minimized according to error back propagation.

Meanwhile, in supervised learning in a case where the neural network 1701 estimates a local dimming pattern and a push-up amount optimal for the video signal corresponding to a target display image, teacher data composed of a local dimming pattern and a push-up amount corresponding to the video signal and the second information that are input data is generated off-line. Then, learning of the neural network 1701 may be performed such that a loss function defined on the basis of each error between the local dimming pattern and the push-up amount that are estimation results of the neural network 1701 and the local dimming pattern and the push-up amount as the teacher data corresponding to the input video signal is minimized.

E-2. Unsupervised Learning of Neural Network (1)

Figure 18:
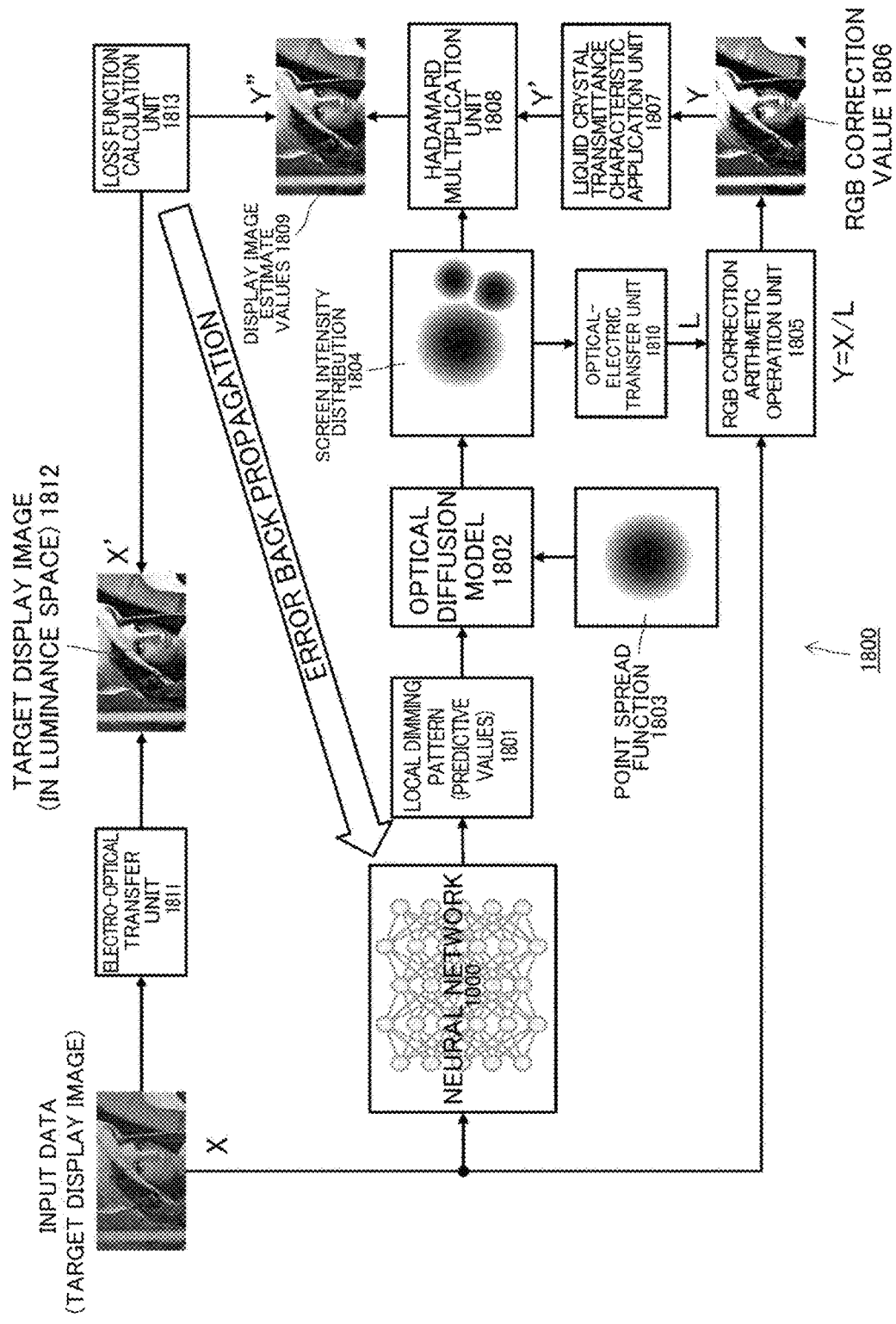
FIG. 18 is a diagram illustrating a configuration example of an unsupervised learning system 1800.

FIG. 18 schematically illustrates a configuration example of an unsupervised learning system 1800 that performs unsupervised learning of the neural network 1000 that estimates a local dimming pattern optimal for a video signal corresponding to a target display image, as illustrated in FIG. 10. In the unsupervised learning system 1800, unsupervised learning is performed such that an image output from the liquid crystal display panel 500 approximates to an original input image according to a local dimming pattern based on estimate values of the neural network 1000.

The neural network 1000 receives a target display image X, predicts and outputs predictive values 1801 of an optimal local dimming pattern. An optical diffusion model 1802 calculates an intensity distribution (hereinafter referred to as a "screen intensity distribution 1804") represented by reference numeral 1804 when each light source unit 511 has been driven on the basis of the predictive values 1801 of the local dimming pattern. This calculation is a forward arithmetic operation of obtaining contribution of each light source unit 511 by weighting a point spread function (PSF) 1803, which represents an intensity distribution formed on the screen surface of the liquid crystal display panel 500 when the entire liquid crystal display panel 500 has been opened 100% according to light from each light source unit 511, with each component corresponding to the predictive values 1801 of the local dimming pattern and calculating the screen intensity distribution 1804 by summing up the contributions obtained from all light source units. The point spread function 1803 is different for each light source unit. This is because, even if the individual light source units 511 have the same light emitting characteristics, they differently affect neighboring display area units 502 according to places where they are disposed as described above (refer to paragraph 0081, for example). Accordingly, an RGB correction arithmetic operation unit 1805 calculates RGB correction values 1806 of the target display image by dividing the target display image X by a screen intensity distribution L on which optical-electric transfer function (OETF) has been executed by an optical-electric transfer unit 1810 for each display area.

The liquid crystal display panel 500 has a transmittance characteristic that is not linear and has characteristics (so-called leak of light and black floating) that a transmittance of a low-luminance area does not decrease from a certain value in general. A liquid crystal transmittance characteristic application unit 1807 applies liquid crystal transmittance characteristics of the liquid crystal display panel 500 to a target display image Y on which RGB correction has been performed to calculate a target display image Y' after transmitting through the liquid crystal display panel 500.

A Hadamard multiplication unit 1808 performs Hadamard multiplication (multiplication for each corresponding pixels) on the target display image Y' and the screen intensity distribution L to calculate estimate values Y'' of the display image of the liquid crystal display panel 500 predicted when local dimming based on the estimate values of the neural network 1000 has been performed.

On the other hand, an electro-optical transfer unit 1811 executes electro-optical transfer function (EOTF) on the target display image X corresponding to input data to the neural network 1000 to calculate a target display image X' in a luminance space, represented by reference numeral 1812.

A loss function calculation unit 1813 feeds back a loss function defined on the basis of an error between the estimate values Y'' of the display image of the liquid crystal display panel 500 based on the estimate values of the neural network 1000 and the target display image X' to the neural network 1000 and performs learning of the neural network 1000 according to error back propagation such that the loss function is minimized.

E-3. Unsupervised Learning of Neural Network (2)

Figure 19:
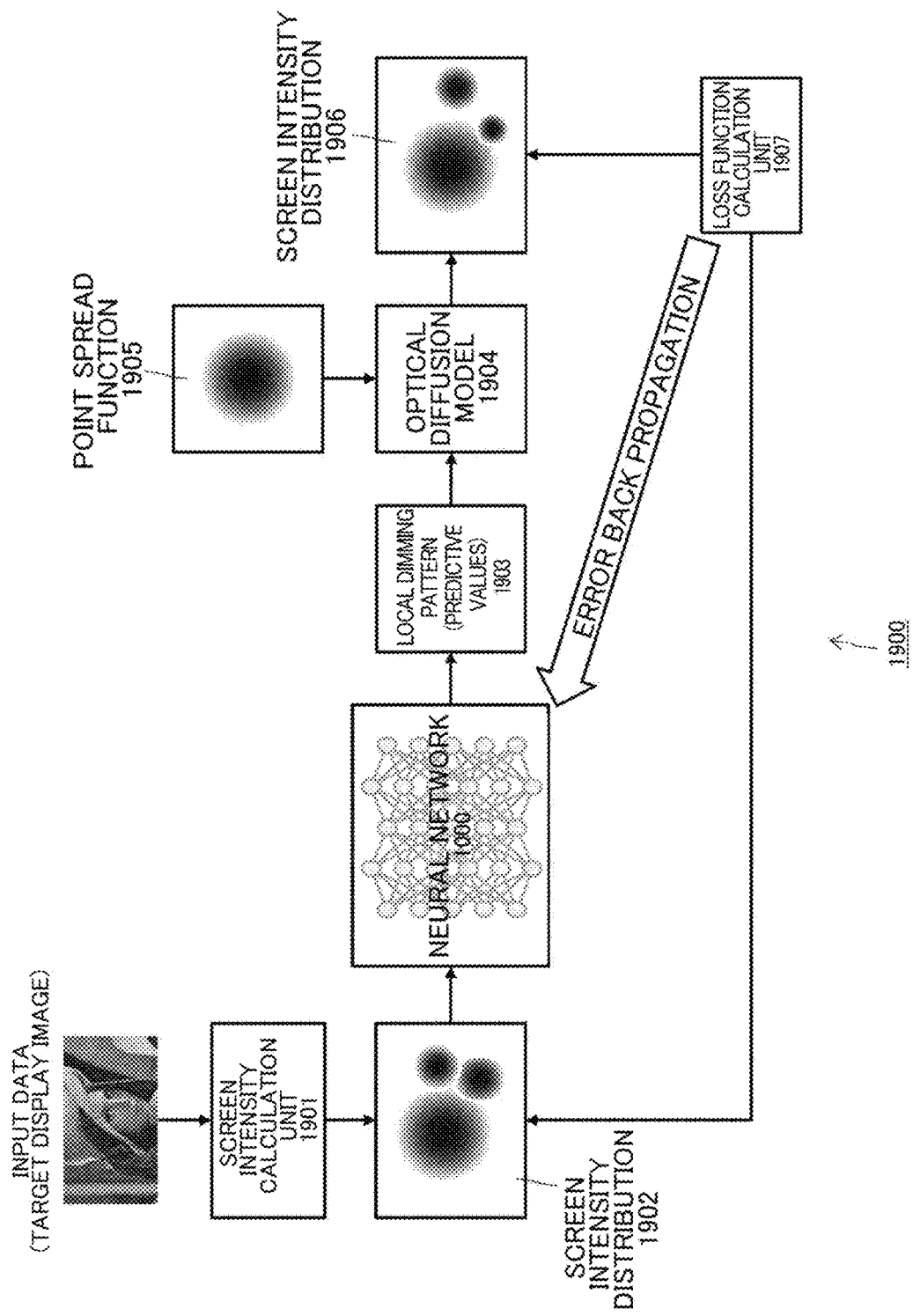
FIG. 19 is a diagram illustrating a configuration example of an unsupervised learning system 1900.

FIG. 19 schematically illustrates a configuration example of an unsupervised learning system 1900 that performs unsupervised learning of the neural network 1000 that estimates a local dimming pattern optimal for a video signal corresponding to a target display image, as illustrated in FIG. 10. In the unsupervised learning system 1900, unsupervised learning is performed such that a screen intensity distribution based on estimate values of the neural network 1000 approximates to an ideal screen intensity distribution of a target display image.

A screen intensity distribution calculation unit 1901 calculates an ideal screen intensity distribution 1902 for a target display image. The screen intensity distribution calculation unit 1901 calculates ideal screen intensity distribution depending on a bright part and a dark part included in the target display image. Since the screen intensity distribution calculation unit 1901 obtains an ideal screen intensity distribution as a state when light from the light source units is diffused by a diffuser or the like and then radiated to the liquid crystal display panel, an optical diffusion model is not considered, but device characteristics of the liquid crystal display panel may be considered. The screen intensity distribution calculation unit 1901 calculates a luminance distribution down-sampled to a resolution of P×Q by dividing a target display image in 4K into P×Q block units, as many as the number of light source units 511, and selecting a maximum luminance of the target display image in each block, and additionally calculates a screen intensity distribution 1902 having a resolution higher than the resolution (P×Q) of the light source units and lower than the resolution (4K) of the target display image by setting 3×3 grids in each divided block and performing interpolation processing on the luminance distribution on the grids.

The neural network 1000 receives the screen intensity distribution 1902, predicts and outputs predictive values 1903 of an optimal local dimming pattern. An optical diffusion model 1904 calculates an intensity distribution (hereinafter referred to as a "screen intensity distribution 1905") represented by reference numeral 1905 when each light source unit 511 has been driven on the basis of the predictive values 1903 of the local dimming pattern. This calculation is a forward arithmetic operation of obtaining contribution of each light source unit 511 by weighting a point spread function (PSF) 1905, which represents an intensity distribution formed on the screen surface of the liquid crystal display panel 500 when the entire liquid crystal display panel 500 has been opened 100% according to light from each light source unit 511, with each component corresponding to the predictive values 1903 of the local dimming pattern and calculating the screen intensity distribution 1906 by summing up contributions obtained from all light source units. The point spread function 1905 is different for each light source unit. This is because, even if the individual light source units 511 have the same light emitting characteristics, they differently affect neighboring display area units 502 according to places where they are disposed as described above (refer to paragraph 0081, for example).

A loss function calculation unit 1907 feeds back a loss function defined on the basis of an error between the screen intensity distribution 1906 and the ideal screen intensity distribution 1902 of the target display image as described above on the basis of the estimate values 1000 of the neural network to the neural network 1000 and performs learning of the neural network 1000 according to error back propagation such that the loss function is minimized.

INDUSTRIAL APPLICABILITY

The present disclosure has been described in detail above with reference to a specific embodiment. However, it will be apparent to those skilled in the art that modification and substation of the embodiment can be made without departing from the gist of the present disclosure.

Although description focuses on an embodiment in which the present disclosure is applied to a television receiver in the present description, the gist of the present disclosure is not limited thereto. The present disclosure can also be equally applied to various types of display devices that present video content to users. For example, the present disclosure can also be equally applied to multi-function information terminals such as a smartphone and a tablet used to watch video streams, media players that display video content reproduced from recording media such as a personal computer and a Blu-ray disk, and the like.

In addition, when video in a high dynamic range is displayed in a display device, it is possible to perform optimal local dimming in real time to curb device deterioration while improving picture quality by applying the present disclosure.

To sum up, the present disclosure has been described according to an illustrative form, but the contents of the present description should not be restrictively construed. The gist of the present disclosure should be determined in consideration of the claims.

Meanwhile, the present disclosure may also be configured as follows.

(1) An image processing device including a trained neural network model that estimates a local dimming pattern representing light emitting states of light source units corresponding to a plurality of areas divided from a display area of an image display unit for a target display image, and
a control unit that controls the light emitting states of the light source units on the basis of the local dimming pattern estimated by the trained neural network model.

(2) The image processing device according to (1), wherein the neural network model is trained on the basis of an error between the target display image input to the neural network model and a screen intensity distribution calculated from the local dimming pattern estimated by the neural network model on the basis of optical propagation calculation.

(3) The image processing device according to (2), wherein the image display unit is a liquid crystal image display unit, and the screen intensity distribution is corrected on the basis of a liquid crystal transmittance of the liquid crystal image display unit in the training.

(4) The image processing device according to (1), wherein the trained neural network model is trained to estimate a local dimming pattern in further consideration of push-up processing of distributing power curbed in a first unit corresponding to a dark part of the display area to a second unit corresponding to a bright part.

(5) The image processing device according to (1) or (2), wherein the trained neural network model is trained to estimate a local dimming pattern for the target display image displayed on the image display unit and second information.

(6) The image processing device according to (5), wherein the second information is an audio signal synchronized with the target display image.

(7) The image processing device according to (5) or (6), wherein the second information includes at least one of information for decoding a video signal of the target display image and information for decoding an audio signal synchronized with the video signal.

(8) The image processing device according to any one of (5) to (7), wherein the second information includes information about content output through the image display unit.

(9) The image processing device according to any one of (5) to (8), wherein the second information includes information about characteristics of the image display unit.

(10) The image processing device according to (9), wherein the information about the characteristics of the image display unit includes at least one of push-up conditions, viewing angle characteristics, response characteristics, and temperature characteristics.

(11) The image processing device according to any one of (5) to (10), wherein the second information includes information about a watching environment of the image display unit.

(12) The image processing device according to any one of (5) to (11), wherein the second information includes information about a user who watches the image display unit.

(13) The image processing device according to any one of (5) to (12), wherein the second information includes information about an operation performed on the image display unit.

(14) An image processing method including a step of estimating, using a trained neural network model that estimates a local dimming pattern representing light emitting states of light source units corresponding to a plurality of areas divided from a display area of an image display unit for a target display image, a local dimming pattern for the target display image to be displayed on the image display unit, and
a step of controlling the light emitting states of the light source units on the basis of the estimated local dimming pattern.

(15) A display device having an artificial intelligence function, including an image display unit capable of controlling light emitting states of light source units corresponding to a plurality of area units divided from a display area,
a trained neural network model that estimates a local dimming pattern representing the light emitting states of the light source units for a target display image to be displayed by the image display unit, and
a control unit that controls the light emitting states of the light source units on the basis of the local dimming pattern estimated by the trained neural network model.

(16) A method of generating a trained neural network model that estimates a local dimming pattern representing light emitting states of light source units corresponding to a plurality of areas divided from a display area of an image display unit for a target display image, the method including
an input step of inputting the target display image to a neural network model, an evaluation step of evaluating a local dimming pattern estimated by the neural network model from the target display image, and
a training step of training the neural network model on the basis of a result of the evaluation.

(17) The method of generating a trained neural network model according to (16), wherein a loss function defined on the basis of an error between the local dimming pattern estimated by the neural network model from the target display image and a local dimming pattern that is teacher data corresponding to the target display image is calculated in the evaluation step, and
the neural network model is trained using the loss function in the training step.

(18) The method of generating a trained neural network model according to (16), wherein contribution of each light source unit is obtained by weighting a point spread function representing an intensity distribution formed by each light source unit of the image display unit with predictive values of a local dimming pattern estimated by the neural network model from a light-source target display image, a screen intensity distribution when each light source unit of the image display unit has been driven is calculated by summing up the contributions obtained from all light source units, a corrected image is calculated by dividing the target display image by the screen intensity distribution, the screen intensity distribution is applied to a corrected image obtained by applying transmission characteristics of the image display unit to the corrected image to calculate an estimation result of a display image in the image display unit, and a loss function defined on the basis of an error between the estimation result of the display image and the target display image input to the neural network is calculated in the evaluation step, and the neural network model is trained using the loss function in the training step.

(19) The method of generating a trained neural network model according to (16), wherein a first screen intensity distribution is calculated from the target display image, contribution of each light source unit is obtained by weighting a point spread function representing an intensity distribution formed by each light source unit of the image display unit with predictive values of a local dimming pattern estimated by the neural network model from a first screen intensity distribution target, a second screen intensity distribution when each light source unit of the image display unit has been driven is calculated by summing up the contributions obtained from all light source units, a loss function defined on the basis of an error between the first screen intensity distribution and the second screen intensity distribution is calculated in the evaluation step, and the neural network model is trained using the loss function in the training step.

(21) An information processing device that controls operation of a display device using an artificial intelligence function, including
an acquisition unit that acquires sensor information, and
an estimation unit that estimates a light emitting state of each of a plurality of units divided from a display area of the display device according to the artificial intelligence function on the basis of the sensor information.

(22) The information processing device according to (21), wherein the estimation unit further estimates a local dimming pattern in further consideration of push-up processing of distributing power curbed in a first unit corresponding to a dark part of the display area to a second unit corresponding to a bright part according to the artificial intelligence function.

(23) The information processing device according to (21) or (22), wherein the sensor information includes a video signal and an audio signal input to the display device.

(24) The information processing device according to (23), wherein the sensor information further includes information for decoding at least one of the video signal and the audio signal.

(25) The information processing device according to (23), wherein the sensor information further includes information about content output through the display device.

(26) The information processing device according to (2), wherein the sensor information further includes information about push-up conditions.

(27) The information processing device according to any one of (21) to (26), wherein the sensor information further includes device characteristics of the display device.

(27-1) The information processing device according to (27), wherein the device characteristics include at least one of a viewing angle, response characteristics, and temperature characteristics when the display device is a liquid crystal display.

(27-2) The information processing device according to (27), wherein the device characteristics include at least one of response characteristics and temperature characteristics of each color when the display device is an LED display.

(28) The information processing device according to any one of (21) to (27), wherein the sensor information includes information about an environment in which the display device is installed.

(29) The information processing device according to (28), wherein the information about the environment includes information about lighting of an indoor space in which the display device is installed or natural light incident on the indoor space.

(30) The information processing device according to any one of (21) to (29), wherein the sensor information includes information about a viewer of the display device.

(31) The information processing device according to any one of (21) to (30), wherein the sensor information includes information about settings performed on the display operation.

(32) The information processing device according to any one of (21) to (31), further including a control unit that controls a light emitting state of each unit on the basis of the estimation result of the estimation unit.

(33) An information processing method for controlling operation of a display device using an artificial intelligence function, including
an acquisition step of acquiring sensor information, and
an estimation step of estimating a light emitting state of each of a plurality of units divided from a display area of the display device according to the artificial intelligence function on the basis of the sensor information.

(34) A display device having an artificial intelligence function, including a display unit having a display area divided into a plurality of units,
an acquisition unit that acquires sensor information,
an estimation unit that estimates a light emitting state of each unit according to the artificial intelligence function on the basis of the sensor information, and a control unit that controls the light emitting state of each unit on the basis of the estimation result.

REFERENCE SIGNS LIST

100 Television reception device
201 Main control unit
202 Bus
203 Storage unit
204 Communication interface (IF) unit 205 Extended interface (IF) unit
206 Tuner/demodulation unit
207 Demultiplexer
208 Video decoder
209 Audio decoder
210 Subtitle decoder
211 Caption decoder
212 Caption compositing unit
213 Data decoder
214 Cache unit
215 Application (AP) control unit
216 Browser unit
217 Sound source unit
218 Video compositing unit
219 Display unit
220 Audio compositing unit
221 Audio output unit
222 Operation input unit
300 Display
301 Speaker unit
301-1, 301-2 Exciter
302 Stand
400 Sensor group
410 Camera unit
411 to 413 Camera
420 User state sensor unit
430 Environmental sensor unit
440 Apparatus state sensor unit
450 User profile sensor unit
500 Display panel
501 Display area
502 Display area unit
510 Backlight
511 Light source unit
520 Backlight driving controller
530 Light source unit driver
540 Liquid crystal display panel driver
1000 Neural network (first configuration example)
1100 Neural network (second configuration example)
1200 Neural network (third configuration example)
1300 Neural network (fourth configuration example)
1400 Neural network (fifth configuration example)
1500 Neural network (sixth configuration example)

The invention claimed is:

1. An image processing device comprising:
a trained neural network model that estimates a local dimming pattern representing light emitting states of light sources corresponding to a plurality of areas divided from a display area of an image display for a target display image for video from a broadcasting source; and
control circuitry configured to control the light emitting states of the light sources on the basis of the local dimming pattern estimated by the trained neural network model,
wherein the neural network model is trained on the basis of an error between the target display image input to the neural network model and a screen intensity distribution calculated from the local dimming pattern estimated by the neural network model on the basis of optical propagation calculation.

2. The image processing device according to claim 1, wherein the image display is a liquid crystal image display, and the screen intensity distribution is corrected on the basis of a liquid crystal transmittance of the liquid crystal image display in the training.

3. The image processing device according to claim 1, wherein the trained neural network model is further trained to estimate the local dimming pattern in further consideration of push-up processing of distributing power curbed in a first unit corresponding to a dark part of the display area to a second unit corresponding to a bright part.

4. The image processing device according to claim 1, wherein the trained neural network model is trained to estimate the local dimming pattern for the target display image displayed on the image display and second information.

5. The image processing device according to claim 4, wherein the second information is an audio signal synchronized with the target display image.

6. The image processing device according to claim 4, wherein the second information includes at least one of information for decoding a video signal of the target display image and information for decoding an audio signal synchronized with the video signal.

7. The image processing device according to claim 4, wherein the second information includes information about content output through the image display.

8. The image processing device according to claim 4, wherein the second information includes information about characteristics of the image display.

9. The image processing device according to claim 8, wherein the information about the characteristics of the image display includes at least one of push-up conditions, viewing angle characteristics, response characteristics, and temperature characteristics.

10. The image processing device according to claim 4, wherein the second information includes information about a watching environment of the image display.

11. The image processing device according to claim 4, wherein the second information includes information about a user who watches the image display.

12. The image processing device according to claim 4, wherein the second information includes information about an operation performed on the image display.

13. An image processing method comprising:
estimating, using a trained neural network model that estimates a local dimming pattern representing light emitting states of light sources corresponding to a plurality of areas divided from a display area of an image display for a target display image, a local dimming pattern for the target display image to be displayed on the image display;
training the neural network model on the basis of an error between a target display image input to the neural network model and a screen intensity distribution calculated from the local dimming pattern estimated by the neural network model on the basis of optical propagation calculation for video from a broadcasting source; and
controlling the light emitting states of the light sources on the basis of the estimated local dimming pattern.

14. A display device having an artificial intelligence function, comprising:
an image display capable of controlling light emitting states of light sources corresponding to a plurality of area units divided from a display area;
a trained neural network model that estimates a local dimming pattern representing the light emitting states of the light sources for a target display image to be displayed by the image display for video from a broadcasting source, and control circuitry configured to control the light emitting states of the light sources on the basis of the local dimming pattern estimated by the trained neural network model, wherein the neural network model is trained on the basis of an error between the target display image input to the neural network model and a screen intensity distribution calculated from the local dimming pattern estimated by the neural network model on the basis of optical propagation calculation.

15. A method of generating a trained neural network model that estimates a local dimming pattern representing light emitting states of light sources corresponding to a plurality of areas divided from a display area of an image display for a target display image, the method comprising:

inputting the target display image to a neural network model;

determining a first screen intensity distribution based on the target display image;

obtaining a second screen intensity distribution when each light source of the image display has been driven, by summing up the contributions obtained from all light sources;

evaluating a local dimming pattern estimated by the neural network model from the target display image in which a loss function defined on the basis of an error between the first screen intensity distribution and the second screen intensity distribution is determined;

obtaining contribution of each light source unit by weighting a point spread function representing an intensity distribution formed by each light source of the image display with predictive values of the local dimming pattern estimated by the neural network model from a first screen intensity distribution target; and training the neural network model on the basis of a result of the evaluation and use of the loss function.

16. The method of generating a trained neural network model according to claim 15, wherein another loss function defined on the basis of an error between the local dimming pattern estimated by the neural network model from the target display image and a local dimming pattern that is teacher data corresponding to the target display image is determined in the evaluating the local dimming pattern, and the neural network model is trained using the another loss function.

17. A method of generating a trained neural network model, the method comprising:

inputting a target display image to a neural network model;

evaluating a local dimming pattern estimated by the neural network model from the target display image in which contribution of each light source is obtained by weighting a point spread function representing an intensity distribution formed by each light source of an image display with predictive values of the local dimming pattern estimated by the neural network model from the target display image and in which a corrected image is determined by dividing the target display image by the screen intensity distribution, the screen intensity distribution is applied to the corrected image obtained by applying transmission characteristics of the image display to the corrected image to calculate an estimation result of a display image in the image display, and a loss function defined on the basis of an error between the estimation result of the display image and the target display image input to the neural network is determined;

determining a screen intensity distribution when each light source of the image display has been driven by summing up the contributions obtained from all light sources;

and training the neural network model based on the loss function.

* * * * *